(12) United States Patent
Kitazawa et al.

(10) Patent No.: US 9,604,307 B2
(45) Date of Patent: Mar. 28, 2017

(54) METHOD OF MANUFACTURING COMPOSITE METAL MATERIAL, METHOD OF MANUFACTURING MOLD, METHOD OF MANUFACTURING METAL PRODUCT, AND COMPOSITE METAL MATERIAL

(71) Applicant: ASAHI CO., LTD., Nagano (JP)

(72) Inventors: Toshiaki Kitazawa, Nagano (JP); Manabu Yoshihara, Nagano (JP)

(73) Assignee: ASAHI CO., LTD., Nagano (JP)

( * ) Notice: Subject to any disclaimer, the term of this patent is extended or adjusted under 35 U.S.C. 154(b) by 0 days.

(21) Appl. No.: 14/113,540

(22) PCT Filed: Oct. 18, 2012

(86) PCT No.: PCT/JP2012/077012
§ 371 (c)(1),
(2) Date: Oct. 23, 2013

(87) PCT Pub. No.: WO2014/061144
PCT Pub. Date: Apr. 24, 2014

(65) Prior Publication Data
US 2015/0283647 A1 Oct. 8, 2015

(51) Int. Cl.
*B23K 20/12* (2006.01)
*B23K 20/22* (2006.01)
(Continued)

(52) U.S. Cl.
CPC ............ *B23K 20/22* (2013.01); *B23K 20/002* (2013.01); *B23K 20/02* (2013.01); *B23K 20/227* (2013.01);
(Continued)

(58) Field of Classification Search
None
See application file for complete search history.

(56) References Cited

U.S. PATENT DOCUMENTS 2,131,953 A * 10/1938 Jardine ................... F01L 3/02
  29/888.451
2,471,663 A *  5/1949 Tietz ....................... A47J 36/02
  126/390.1
(Continued)

FOREIGN PATENT DOCUMENTS

CN    2421918 Y       3/2001
GB    1356838 A  *   6/1974  ........... B23K 20/023
(Continued)

OTHER PUBLICATIONS

Corresponding International Application No. PCT/JP2012/077012 Search Report dated Mar. 19, 2013.

*Primary Examiner* — Kiley Stoner
(74) *Attorney, Agent, or Firm* — Hauptman Ham, LLP

(57) ABSTRACT

Provided is a method of manufacturing a composite metal material which includes a first metal member made of first metal and a second metal member made of second metal having a smaller linear expansion coefficient than first metal. The method includes in the following order: a metal member preparation step of preparing the first metal member made of first metal and a plurality of divided members made of second metal; an assembling step of assembling the respective metal members into an assembled body; and a bonding step of, by applying a first temperature and a first pressure which enable the respective metal materials to be bonded to each other to the assembled body, bonding the plurality of divided members to each other thus forming the second metal member and also of bonding the first metal member and the second metal member to each other.

11 Claims, 19 Drawing Sheets

(51) Int. Cl.
  *B23K 20/02*    (2006.01)
  *B23K 20/00*    (2006.01)
  *B23K 31/02*    (2006.01)
  *B32B 15/01*    (2006.01)
  *B23K 20/227*   (2006.01)
  *B23K 103/22*   (2006.01)

(52) U.S. Cl.
  CPC .............. *B23K 31/02* (2013.01); *B32B 15/01*
       (2013.01); *B23K 2203/22* (2013.01); *Y10T*
       *428/12486* (2015.01)

(56) References Cited

U.S. PATENT DOCUMENTS

| | | | | |
|---|---|---|---|---|
| 2,744,314 A * | 5/1956 | Kinney, Jr. | ............ | B23K 20/04 |
| | | | | 228/160 |
| 2,759,246 A * | 8/1956 | Campbell | ............... | B21C 37/14 |
| | | | | 165/170 |
| 2,947,078 A * | 8/1960 | Pflumm | ................. | B23K 20/00 |
| | | | | 228/127 |
| 3,019,513 A * | 2/1962 | Hornaday, Jr. | ....... | B21D 53/045 |
| | | | | 228/116 |
| 3,070,880 A * | 1/1963 | Davis | ................... | B23K 20/023 |
| | | | | 220/2.1 R |
| 3,156,976 A * | 11/1964 | Whiting | ............... | B23K 20/233 |
| | | | | 228/131 |
| 3,320,666 A * | 5/1967 | Dion | ..................... | B23K 20/04 |
| | | | | 228/125 |
| T860,019 I4 * | 3/1969 | Tör | ......................... | B23K 20/08 |
| | | | | 228/126 |
| 3,514,840 A * | 6/1970 | Pitler | ..................... | B23K 20/04 |
| | | | | 228/117 |
| 3,561,099 A * | 2/1971 | Mizuhara | ........... | B23K 35/0238 |
| | | | | 219/121.14 |
| 3,563,713 A * | 2/1971 | Rudd | ..................... | B23K 20/085 |
| | | | | 228/107 |
| 3,620,880 A * | 11/1971 | Lemelson | ............. | B23K 20/04 |
| | | | | 156/383 |
| 3,811,311 A * | 5/1974 | Barone | ................. | B21C 37/042 |
| | | | | 72/278 |
| 5,147,086 A * | 9/1992 | Fujikawa | .............. | B22F 3/1258 |
| | | | | 228/186 |
| 5,761,799 A * | 6/1998 | Mennucci | ............. | B23K 20/04 |
| | | | | 29/17.3 |
| 6,251,527 B1 * | 6/2001 | Schelin | ................. | B32B 15/016 |
| | | | | 428/582 |
| 6,267,830 B1 * | 7/2001 | Groll | ..................... | A47J 27/002 |
| | | | | 148/531 |
| 2002/0158112 A1 | 10/2002 | Rodhammer | | |
| 2004/0013151 A1 * | 1/2004 | Sumida | ................ | H01S 3/0606 |
| | | | | 372/72 |
| 2006/0150387 A1 | 7/2006 | Kobayashi et al. | | |
| 2007/0000915 A1 * | 1/2007 | Cheng | ................... | A47J 27/002 |
| | | | | 219/621 |
| 2008/0116246 A1 * | 5/2008 | Rigal | ..................... | B23K 20/021 |
| | | | | 228/193 |
| 2008/0196794 A1 * | 8/2008 | Blandin | .................. | B32B 15/01 |
| | | | | 148/522 |
| 2009/0220818 A1 * | 9/2009 | Asanuma | ................ | H01L 41/37 |
| | | | | 428/633 |
| 2010/0101768 A1 * | 4/2010 | Seo | ........................... | F28F 3/12 |
| | | | | 165/168 |
| 2010/0297463 A1 * | 11/2010 | Hoffstaedter | .......... | B23K 20/02 |
| | | | | 428/573 |
| 2010/0307722 A1 | 12/2010 | Ryoson et al. | | |
| 2011/0297269 A1 * | 12/2011 | Pilon | ....................... | B22F 5/106 |
| | | | | 138/141 |
| 2012/0107979 A1 * | 5/2012 | Moon | ................... | H01L 33/0079 |
| | | | | 438/29 |
| 2013/0071686 A1 * | 3/2013 | Oda | ...................... | B32B 15/017 |
| | | | | 428/652 |
| 2013/0086785 A1 * | 4/2013 | Cui | ........................ | B32B 15/01 |
| | | | | 29/402.18 |
| 2013/0130119 A1 * | 5/2013 | Majima | .................. | B23K 20/04 |
| | | | | 429/231.8 |
| 2013/0216302 A1 * | 8/2013 | Yanase | ................... | B23K 20/023 |
| | | | | 403/272 |
| 2014/0193666 A1 * | 7/2014 | Brinkman | .......... | B23K 20/2336 |
| | | | | 428/654 |
| 2015/0034229 A1 * | 2/2015 | Ochs | ...................... | B32B 37/08 |
| | | | | 156/73.1 |
| 2015/0190985 A1 * | 7/2015 | Oda | ..................... | H01L 23/3735 |
| | | | | 312/236 |
| 2015/0262725 A1 * | 9/2015 | Sagawa | .................... | B32B 15/01 |
| | | | | 428/607 |

FOREIGN PATENT DOCUMENTS

| | | | |
|---|---|---|---|
| JP | 1-12592 B2 | | 3/1989 |
| JP | 06234079 A | * | 8/1994 |
| JP | 08-103856 A | | 4/1996 |
| JP | 08-281768 A | | 10/1996 |
| JP | 09-271883 A | | 10/1997 |
| JP | 3171409 B2 | * | 5/2001 |
| JP | 3188745 B2 | * | 7/2001 |
| JP | 2003-039179 A | | 2/2003 |
| JP | 2003-103324 A | | 4/2003 |
| JP | 2006-175502 A | | 7/2006 |
| JP | 2006-263732 A | | 10/2006 |
| JP | 2008291316 A | * | 12/2008 |
| JP | 2010-064132 A | | 3/2010 |
| JP | 2010-169379 A | | 8/2010 |
| JP | 2010-221244 A | | 10/2010 |
| JP | 2010-286134 A | | 12/2010 |
| JP | 2012-091202 A | | 5/2012 |

\* cited by examiner

METHOD OF MANUFACTURING COMPOSITE METAL MATERIAL, METHOD OF MANUFACTURING MOLD, METHOD OF MANUFACTURING METAL PRODUCT, AND COMPOSITE METAL MATERIAL

RELATED APPLICATIONS

The present application is a National Phase of International Application Number PCT/2012/077012, filed Oct. 18, 2012.

TECHNICAL FIELD

The present invention relates to a method of manufacturing a composite metal material, a method of manufacturing a mold, a method of manufacturing a metal product and a composite metal material.

BACKGROUND ART

Conventionally, there have been well-known a method of manufacturing a plate-like composite metal material which includes a plate-like first metal member made of first metal and a plate-like second metal member made of second metal, and a composite metal material which is manufactured by the method of manufacturing a composite metal material (for example, see patent literature 1). FIG. 20A to FIG. 20D are views for explaining a conventional method of manufacturing a composite metal material. That is, FIG. 20A to FIG. 20D are views for explaining respective steps of the method of manufacturing a composite metal material. FIG. 20A to FIG. 20D are all side views (views where edge portions of a bonding portion of a composite metal material 900 are shown).

The conventional method of manufacturing a composite metal material is, as shown in FIG. 20A to FIG. 20D, a method of manufacturing the composite metal material 900 (see FIG. 20D) which includes a first metal member 910 made of first metal and a second metal member 920 made of second metal. The method includes: a metal member preparation step for preparing the plate-like first metal member 910 and the plate-like second metal member 920 (see FIG. 20A); a lamination step for laminating the first metal member 910 and the second metal member 920 to each other (see FIG. 20B); and a bonding step for bonding the first metal member 910 and the second metal member 920 to each other by applying a temperature which enables the laminated metal members to be bonded to each other and by applying a pressure which enables the laminated metal members to be bonded to each other thus forming the composite metal material 900 (see FIG. 20C and FIG. 20D) in this order.

The conventional composite metal material 900 is manufactured by such a conventional method of manufacturing a composite metal material, and includes the first metal member 910 and the second metal member 920 as shown in FIG. 20D.

According to the conventional method of manufacturing a composite metal material, metal having different properties are prepared as the first metal member 910 and the second metal member 920, and these metals are bonded to each other and hence, it is possible to manufacture a composite metal material which can be used in various applications. Further, the conventional composite metal material 900 can be used in various applications by making use of advantages brought about by being a composite metal material.

PRIOR ART LITERATURE

Patent Literature

Patent Literature 1: JP-A-2006-175502

SUMMARY OF THE INVENTION

Technical Problem

In the conventional method of manufacturing a composite metal material, the manufactured composite metal material 900 has edge portions where both the first metal member 910 and the second metal member 920 and tip ends of a bonded portion J between the first metal member 910 and the second metal member 920 are exposed to the outside (see FIG. 20D). However, conventionally, there have been made no proposals with respect to a method of manufacturing a composite metal material where a first metal member is enclosed by a second metal member and the first metal member and the second metal member are bonded to each other.

If the above-mentioned composite metal material could be manufactured, such a composite metal material can be used as a useful industrial material which has not existed in the past. As a specific example, by manufacturing a composite metal material using a first metal member made of metal having high thermal conductivity but lacking in the strength and a second metal member having excellent strength but having low thermal conductivity, it is possible to provide a composite metal material which satisfies both high thermal conductivity and excellent strength as a whole.

The present invention has been made under such circumstances, and it is an object according to the present invention to provide a method of manufacturing a composite metal material by which a useful composite metal material which has not existed in the past can be manufactured. Further, it is another object according to the present invention to provide a method of manufacturing a mold and a method of manufacturing a metal product which use a composite metal material manufactured by the method of manufacturing a composite metal material according to the present invention. Still further, it is another object according to the present invention to provide a useful composite metal material which has not existed in the past.

Solution to Problem

[1] According to one aspect of the present invention, there is provided a method of manufacturing a composite metal material which includes a first metal member made of first metal and a second metal member made of second metal having a smaller linear expansion coefficient than first metal, the method including in the following order: a metal member preparation step of preparing the first metal member, and a plurality of divided members which are made of second metal and form a first metal member accommodating portion capable of enclosing the first metal member when assembled to each other; an assembling step of assembling the plurality of divided members to each other in a state where the first metal member is arranged in the first metal member accommodating portion thus forming an assembled body; and a bonding step of, by applying a first temperature and a first pressure which enable the respective metal materials to be bonded to each other to the assembled body, bonding the plurality of divided members to each other thus forming the second metal member, and also of bonding the first metal member and the second metal member to each other.

According to the method of manufacturing a composite metal material according to the present invention, the method includes the metal member preparation step, the assembling step and the bonding step in this order and hence, in the bonding step, the second metal member can be formed by bonding the plurality of divided members to each other, and the first metal member and the second metal member can be also bonded to each other with a pressure generated due to the difference in linear expansion coefficient between first metal and second metal (referred to as "second pressure" hereinafter). Accordingly, it is possible to manufacture the useful composite metal material which has not existed in the past where the first metal member is enclosed by the second metal member, and the first metal member and the second metal member are bonded to each other.

According to the method of manufacturing a composite metal material according to the present invention, the first metal member made of first metal and the second metal member made of second metal having a smaller linear expansion coefficient than first metal are used. Accordingly, by merely applying a pressure to the assembled body from the outside in the bonding step, the first metal member which is expanded by heat applies a pressure to the second metal member from the inside so that the first metal member and the second metal member can be bonded to each other.

According to the method of manufacturing a composite metal material according to the present invention, the first metal member and the second metal member are bonded to each other and hence, compared to a case where the first metal member and the second metal member are merely in contact with each other, the strength of the manufactured composite metal material can be enhanced and, further, heat, electricity and the like can be smoothly transmitted between the second metal member and the first metal member.

In the method of manufacturing a composite metal material according to the present invention, it is preferable to bond the first metal member and the second metal member to each other by solid phase diffusion bonding. By adopting such a method, compared to a case where bonding is performed by melting metal as in the case of welding, a residual stress which remains in the composite metal material after bonding can be largely decreased.

In the method of manufacturing a composite metal material according to the present invention, although it may be possible to use completely different kinds of metals (for example, copper and iron) as first metal and second metal respectively, the present invention is not limited to such a case. Provided that first metal and second metal differ from each other in linear expansion coefficient, metals containing the same kind of metal as a main component such as steel-based alloys (stainless steel, die steel, carbon steel and the like) may be used as first metal and second metal, for example. "linear expansion coefficient" is a kind of "thermal expansion coefficient" and means a rate at which a length of a certain material changes due to the elevation of a temperature in the certain material.

It is sufficient for the first metal member accommodating portion to have hermetic property to an extent that a sufficient pressure is applied between the first metal member and the second metal member in the bonding step. That is, the first metal member accommodating portion may be configured to completely seal the first metal member therein in a hermetic manner or may be configured not to completely seal the first metal member therein in a hermetic manner (holes, spaces or the like may be formed in arbitrary portions of the first metal member accommodating portion to an extent that the holes, spaces or the like do not impede the bonding between the first metal member and the second metal member, for example).

Further, in this specification, "enclosing" includes, in its definition, not only a state where a certain material (first metal member) is completely sealed in another material (second metal member) in a hermetic manner but also a state where the certain material is not completely sealed in another material in a hermetic manner (for example, a state where the certain material is substantially enclosed by another material). That is, "enclosing" means a state where a certain material is arranged in the inside of another material, and is not directly relevant to whether or not the certain material is sealed in another material in a hermetic manner.

With respect to the composite metal material manufactured by the method of manufacturing a composite metal material according to the present invention, when the composite metal material is manufactured using the first metal member made of metal which has high thermal conductivity but lacking in the strength and the second metal member made of metal which has excellent strength but low thermal conductivity, for example, the composite metal material can acquire both the excellent thermal conductivity and the excellent strength as a whole. By making use of such properties of the composite metal material, the composite metal material can be used as a material for manufacturing a mold, a cooling block (chill vent) for a mold, a brake rotor, an engine cooling member, an ornamental product or the like. By using first metal and second metal which differ from each other in a magnetic property, it is possible provide an industrial material having an electromagnetic property which has not existed in the past.

In the method of manufacturing a composite metal material according to the present invention, it is preferable that the first pressure is a pressure which enables a plurality of divided members to be bonded to each other and to resist against the thermal expansion of the first metal member. By adopting such a method, the second metal member can be formed by bonding the plurality of divided members to each other, and the first metal member and the second metal member can be also bonded to each other.

[2] According to the method of manufacturing a composite metal material according to the present invention, it is preferable that plurality of divided members which are divided along a plane parallel to each other are prepared as the plurality of divided members in the metal member preparation step; and the first pressure is applied to the assembled body in a direction perpendicular to the plane in the bonding step.

By adopting such a method, the composite metal material can be manufactured easily compared to a case where a pressure is applied to the assembled body from all directions.

Provided that the pressure in the direction perpendicular to the predetermined plane is sufficient, a sufficient pressure (second pressure) is generated also in the direction parallel to the predetermined plane due to the thermal expansion of the first metal member and hence, the bonding is possible also in such a direction due to such a pressure.

[3] According to the method of manufacturing a composite metal material according to the present invention, it is preferable that the bonding is performed in the bonding step such that a pressure which the assembled body receives becomes a fixed value.

By adopting such a method, a composite metal material having stable quality can be manufactured.

"the bonding is performed such that a pressure which the assembled body receives becomes a fixed value" means that the bonding is performed such that the pressure which the assembled body receives becomes a fixed value at least during a period where the first temperature is applied to the assembled body by taking into account the influence of thermal expansion, softening or the like exerted on the assembled body. The above-mentioned bonding can be performed by using a device which measures a pressure which the assembled body receives and a device which dynamically adjusts the first pressure, for example.

Various machines can be used for applying the first pressure to the assembled body. However, to consider the above-mentioned constitution [3], it is preferable to use a device which can finely adjust a pressure (for example, a computer-controlled hydraulic press).

[4] According to the method of manufacturing a composite metal material according to the present invention, it is preferable that the first temperature is lower than a melting point of first metal and a melting point of second metal in the bonding step.

By adopting such a method, it is possible to bond the first metal member and the second metal member to each other by solid phase diffusion bonding without melting the first metal member and the second metal member. As a result, compared to a case where bonding is performed by melting metal as in the case of welding, a residual stress which remains in the composite metal material after bonding can be largely decreased.

[5] According to the method of manufacturing a composite metal material according to the present invention, it is preferable that the bonding step is carried out under a vacuum condition.

By adopting such a method, oxidization of the metal member can be prevented.

Further, by adopting such a method, even when a gap exists between the metal members in the assembled body, it is possible to prevent lowering of a bonding force between the metal members.

[6] According to another aspect of the present invention, there is provided a method of manufacturing a mold including in the following order: a composite metal material manufacturing step of manufacturing a composite metal material by the method of manufacturing a composite metal material according to any one of claims 1 to 5; and a recessed portion forming step of forming, in a portion of the composite metal material which is formed of the second metal member, a recessed portion which defines a cavity when a mold is combined with the other mold or other molds.

According to the method of manufacturing a mold according to the present invention, the method includes the composite metal material manufacturing step of manufacturing a composite metal material by the method of manufacturing a composite metal material according to the present invention and hence, it is possible to manufacture a mold using a useful composite metal material which has not existed in the past.

Particularly, when the first metal member which has high thermal conductivity but lacking in the strength and the second metal member which has excellent strength but low thermal conductivity are used, it is possible to manufacture a mold which is excellent in both the thermal conductivity and the excellent strength as a whole.

In this specification, the "recessed portion" means a portion having an indented shape. A portion having a projecting shape such as a raised portion or a protrusion may be formed in the recessed portion or around the recessed portion.

[7] In the method of manufacturing a mold according to the present invention, it is preferable that first metal has the higher thermal conductivity than second metal, and the thermal conductivity of first metal at a room temperature is 50 W/(m·K) or above.

By adopting such a method, it is possible to manufacture a mold which is excellent particularly in thermal conductivity.

[8] According to the method of manufacturing a mold according to the present invention, it is preferable that a heat exchange medium flow path is formed in the recessed portion forming step such that the heat exchange medium flow path penetrates a portion formed of the first metal member.

By adopting such a method, the temperature adjustment (heat exchange) of a manufactured mold can be easily performed by allowing a heat exchange medium to pass through the heat exchange medium flow path.

Further, the heat exchange medium flow path is formed such that the heat exchange medium flow path penetrates the first metal member having high thermal conductivity. Accordingly, by speedily changing a temperature of the whole mold by speedily spreading a heat exchange effect generated by the heat exchange medium over the whole mold, it is possible to manufacture the mold whose temperature control can be performed accurately and uniformly.

"the heat exchange medium flow path penetrates a portion formed of the first metal member" includes, in addition to a state where the heat exchange medium flow path penetrates the portion formed of the first metal member, a case where the heat exchange medium flow path penetrates a bonded portion between the first metal member and the second metal member.

[9] According to still another aspect of the present invention, there is provided a method of manufacturing a metal product including in the following order: a composite metal material manufacturing step of manufacturing a composite metal material by the method of manufacturing a composite metal material according to any one of claims 1 to 5; and a working step of manufacturing a metal product by applying working to the composite metal material.

According to the method of manufacturing a metal product according to the present invention, the method includes the composite metal material manufacturing step of manufacturing a composite metal material by the method of manufacturing a composite metal material according to the present invention and hence, it is possible to manufacture a metal product which uses a composite metal material which has not existed in the past.

As the metal product manufactured by the method of manufacturing a metal product according to the present invention, a cooling block (chill vent) for a mold, a brake rotor (see an embodiment 4 described later), an engine cooling member, and an ornamental product (see an example 1 described later) are named, for example. Further, it is also possible to provide a metal product having a unique electromagnetic property by using first metal and second metal having different magnetic properties.

[10] According to still another one aspect of the present invention, there is provided a composite metal material manufactured by the method of manufacturing a composite metal material according to any one of claims 1 to 5, the composite metal material including: a first metal member made of first metal; and a second metal member made of second metal having a smaller linear expansion coefficient than first metal, wherein the second metal member encloses the first metal member, and the first metal member and the second metal member are bonded to each other on a plane where the first metal member and the second metal member face each other in an opposed manner.

The composite metal material according to the present invention is the composite metal material manufactured by the method of manufacturing a composite metal material according to the present invention and hence, it is possible to provide a useful composite metal material which has not existed in the past.

Further, according to the composite metal material according to the present invention, the first metal member and the second metal member are bonded to each other and hence, it is possible to provide the composite metal material where no clear boundary exists between the first metal member and the second metal member. Accordingly, it is possible to increase the strength of the manufactured composite metal material. Further, continuity is ensured between the members in property and hence, heat, electricity and the like can be smoothly transmitted between the members.

[11] According to still another aspect of the present invention, there is provided a composite metal material including: a first metal member made of first metal; and a second metal member made of second metal having a smaller linear expansion coefficient than first metal, wherein the second metal member encloses the first metal member, and the first metal member and the second metal member are bonded to each other on a plane where the first metal member and the second metal member face each other in an opposed manner.

Since the composite metal material according to the present invention has the above-mentioned constitution, it is possible to provide a useful composite metal material which has not existed in the past.

Further, according to the composite metal material according to the present invention, the first metal member and the second metal member are bonded to each other and hence, it is possible to provide the composite metal material where no clear boundary exists between the first metal member and the second metal member. Accordingly, it is possible to increase the strength of the manufactured composite metal material. Further, continuity is ensured between the members in property and hence, heat, electricity and the like can be smoothly transmitted between the members.

In the composite metal material according to the present invention, working (cutting, polishing or the like) may be applied to a portion of each metal member.

DESCRIPTION OF EMBODIMENTS

Figure 1A:
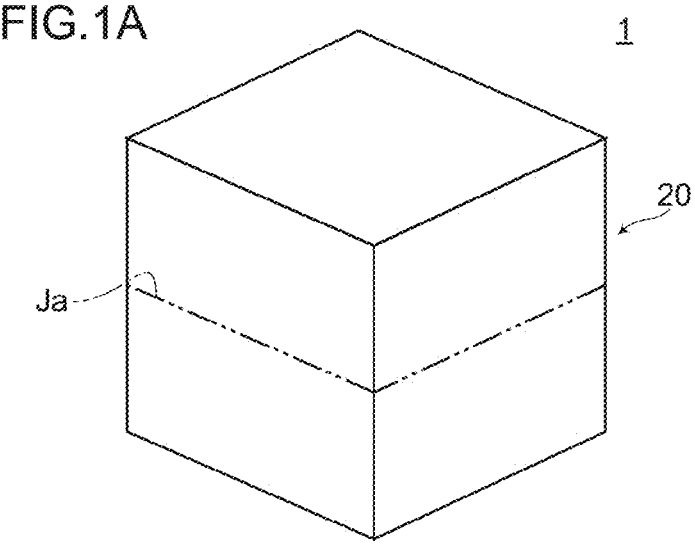
FIG. 1A to FIG. 1C are views for explaining a composite metal material of an embodiment 1.

Hereinafter, a method of manufacturing a composite metal material, a method of manufacturing a mold, a method of manufacturing a metal product, and a composite metal material according to the present invention are explained in conjunction with embodiments shown in the drawings.

Embodiment 1

Figure 1B:
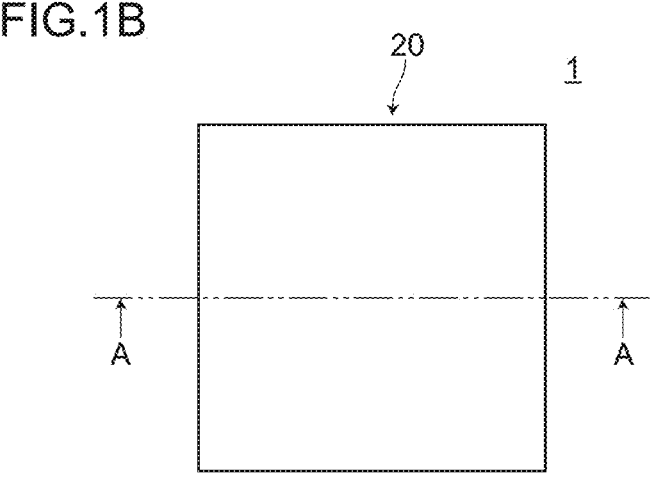
Figure 1C:
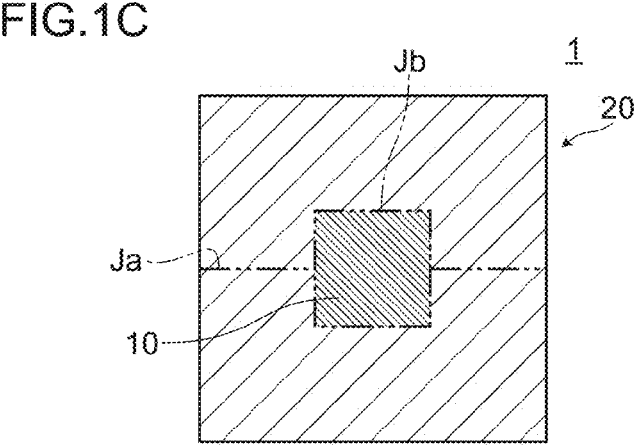

FIG. 1A and FIG. 1B are views for explaining a composite metal material 1 of the embodiment 1. FIG. 1A is a perspective view of the composite metal material 1, FIG. 1B is a top plan view of the composite metal material 1, and FIG. 1C is a cross-sectional view taken along a line A-A in FIG. 1B.

Figure 2:
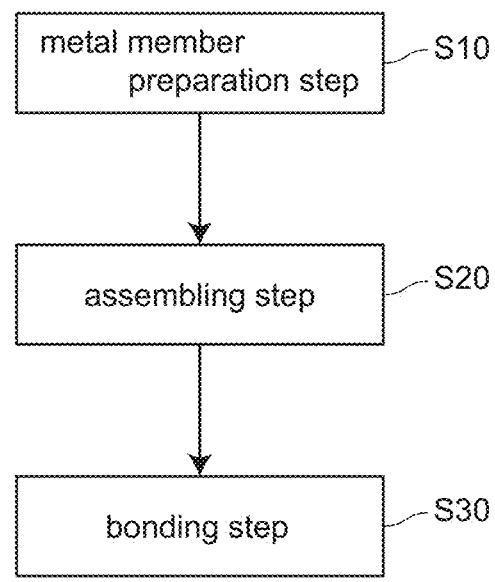
FIG. 2 is a flowchart of a method of manufacturing a composite metal material of the embodiment 1.

FIG. 2 is a flowchart of a method of manufacturing a composite metal material of the embodiment 1.

Figure 3A:
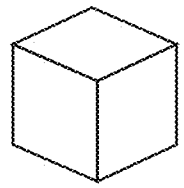
FIG. 3A and FIG. 3B are views for explaining a first metal member used in the embodiment 1.
Figure 3B:
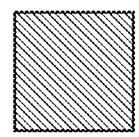

FIG. 3A and FIG. 3B are views for explaining a first metal member 10 used in the embodiment 1. FIG. 3A is a perspective view of the first metal member 10, and FIG. 3B is a cross-sectional view of the first metal member 10. FIG. 3B is the cross-sectional view corresponding to FIG. 1C.

Figure 4A:
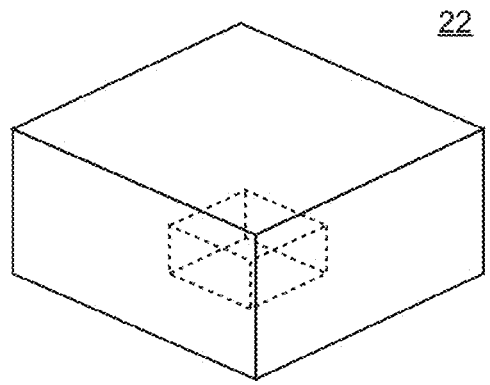
FIG. 4A to FIG. 4E are views for explaining a plurality of divided members used in the embodiment 1.
Figure 4B:
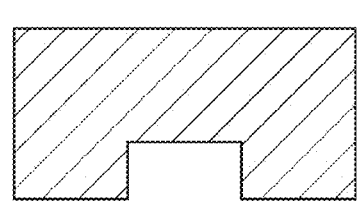
Figure 4C:
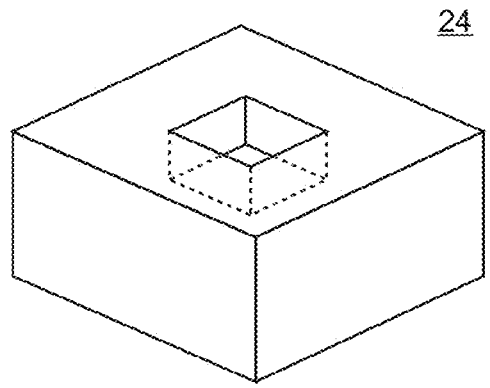
Figure 4D:
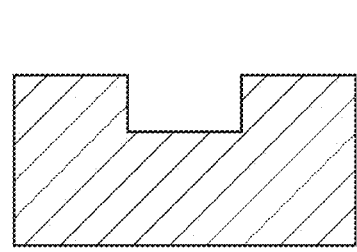
Figure 4E:
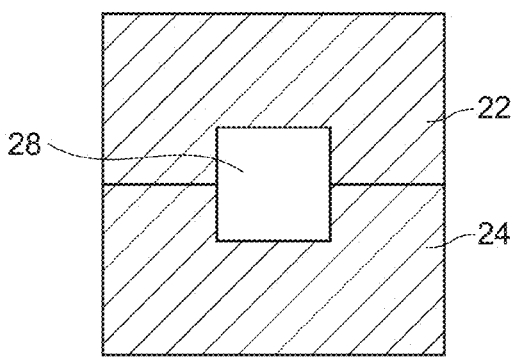

FIG. 4A to FIG. 4E are views for explaining a plurality of divided members 22, 24 used in the embodiment 1. FIG. 4A is a perspective view of the divided member 22, FIG. 4B is a cross-sectional view of the divided member 22, FIG. 4C is a perspective view of the divided member 24, FIG. 4D is a cross-sectional view of the divided member 24, and FIG. 4E is a cross-sectional view showing a state where only the plurality of divided members 22, 24 are assembled to each other. The cross-sectional views shown in FIG. 4 are cross-sectional views corresponding to FIG. 1C.

Figure 5A:
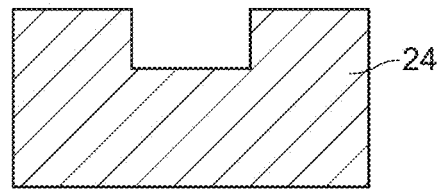
FIG. 5 to FIG. 5C are views for explaining an assembling step in the embodiment 1.
Figure 5B:
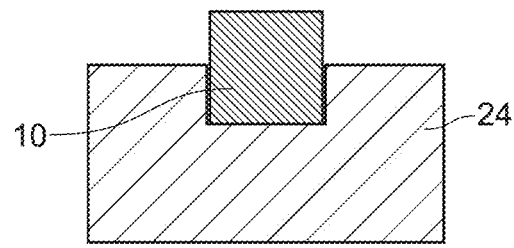
Figure 5C:
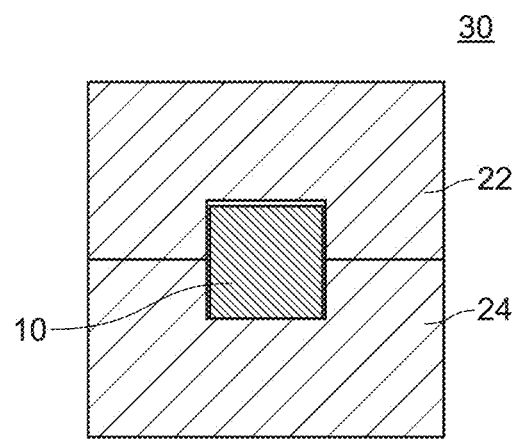

FIG. 5A to FIG. 5C are views for explaining an assembling step S20 in the embodiment 1. FIG. 5A to FIG. 5C are views showing the manner of assembling an assembled body 30. FIG. 5 is a cross-sectional view corresponding to FIG. 1C.

Figure 6A:
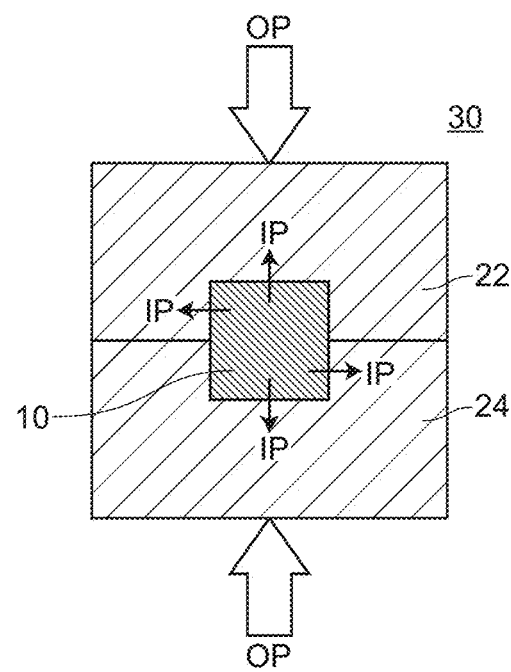
FIG. 6A and FIG. 6B are views for explaining a bonding step in the embodiment 1.
Figure 6B:
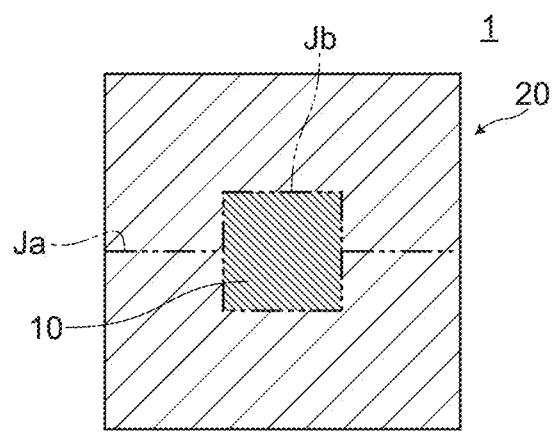

FIG. 6A and FIG. 6B are views for explaining a bonding step S30 in the embodiment 1. FIG. 6A is a cross-sectional view showing a state where a first temperature (not shown in the drawing) and a first pressure OP are applied to the assembled body 30, and FIG. 6B is a cross-sectional view of the assembled body 30 after the bonding step S30 is carried out (that is, a view of the composite metal material 1). In FIG. 6A, an arrow indicated by symbol IP indicates a pressure (second pressure) brought about due to the expansion of the first metal member 10. FIG. 6 is a cross-sectional view corresponding to FIG. 1C.

Firstly, the explanation is made with respect to the composite metal material 1 which is manufactured by the method of manufacturing a composite metal material of the embodiment 1.

The composite metal material 1 of the embodiment 1 includes, as shown in FIG. 1, the first metal member 10 made of first metal and a second metal member 20 made of second metal having a smaller linear expansion coefficient than first metal, wherein the second metal member 20 encloses the first metal member 10, and the first metal member 10 and the second metal member 20 are bonded to each other on a plane where the first metal member 10 and the second metal member 20 face each other in an opposed manner. The first metal member 10 and the second metal member 20 are bonded to each other by so-called solid phase diffusion bonding.

A volume ratio of the first metal member 10 which occupies in the second metal member 20 in the embodiment 1 is merely an example, and such a volume ratio may be increased or decreased depending on usage and purpose of the composite metal material 1.

In the composite metal material 1, first metal is pure copper (linear expansion coefficient: approximately $16.8 \times 10^{-6}$/K) which is simply referred to as copper hereinafter, and second metal is SKD61 (linear expansion coefficient: approximately $13.3 \times 10^{-6}$/K) which is simply referred to as die steel hereinafter. The combination of metals which can be used for manufacturing a composite metal material according to the present invention is not limited to the above-mentioned combination. Various combinations of metals can be used corresponding to applications where a composite metal material is used.

In FIG. 1, symbol Jb indicates a bonded portion between the first metal member 10 and the second metal member 20, and symbol Ja indicates a bonded portion between the plurality of divided members 22, 24 (described later) which constitute the second metal member 20. The bonded portion Ja is a portion where metals of the same kind are bonded to each other and hence, it is not always the case that a line shown in FIG. 1A can be visually recognized in an actually manufactured composite metal material.

In the composite metal material 1 of the embodiment 1, the first metal member 10 is made of copper having high thermal conductivity but having less strength, while the second metal member 20 is made of die steel having excellent strength but having low thermal conductivity. Accordingly, the composite metal material 1 can acquire, as a whole, both the excellent thermal conductivity and the excellent strength. By making use of such properties of the composite metal material, the composite metal material 1 can be used as a material for manufacturing a mold, a cooling block (chill vent) for a mold, a brake rotor, an engine cooling member or the like, for example.

Next, the method of manufacturing a composite metal material of the embodiment 1 is explained.

The method of manufacturing a composite metal material of the embodiment 1 is substantially a method of manufacturing a composite metal material which includes: the first metal member 10 made of first metal; and the second metal member 20 made of second metal having a smaller linear expansion coefficient than first metal. As shown in FIG. 2, the manufacturing method includes: a metal member preparation step S10; an assembling step S20; and a bonding step S30 in this order. Hereinafter, respective steps are explained.

1. Metal Member Preparation Step S10

In the metal member preparation step S10, the first metal member 10 made of first metal (see FIG. 3), and a plurality of divided members 22, 24 made of second metal are prepared. The plurality of divided members 22, 24 form a first metal member accommodating portion 28 in which the first metal member 10 accommodated when the divided members 22, 24 are assembled to each other (see FIG. 4).

In the embodiment 1, the first metal member accommodating portion 28 is formed such that a size of the first metal member accommodating portion 28 is slightly larger than a size of the first metal member 10 (a gap of approximately 2 μm is formed between the first metal member accommodating portion 28 and the first metal member 10 as a whole when the first metal member 10 is arranged in the first metal member accommodating portion 28, for example).

In the metal member preparation step S10, as the plurality of divided members 22, 24, a plurality of divided members which are divided along a predetermined plane parallel to each other are prepared. The predetermined plane in the embodiment 1 is a plane perpendicular to a cross section taken along a line A-A in FIG. 1C.

The method of manufacturing a composite metal material of the embodiment 1 is the method of manufacturing the above-mentioned composite metal material 1 and hence, first metal is copper and second metal is die steel. The first metal member 10 and the plurality of divided members 22, 24 can be prepared by cutting and polishing a metal block, for example. The first metal member 10 and the plurality of divided members 22, 24 may also be prepared by purchasing commercially available products which conform to a use purpose.

In the embodiment 1, although the plurality of divided members 22, 24 are configured such that the first metal member accommodating portion 28 completely hermetically seals the first metal member 10 therein when the plurality of divided members 22, 24 are assembled into an assembled body, the present invention is not limited to such a constitution. Provided that a pressure sufficient to bond the first metal member and the second metal member to each other can be acquired in the bonding step, the plurality of divided members may be configured such that the first metal member accommodating portion does not completely hermetically seal the first metal member therein (that is, allowing the presence of a gap communicating with the outside) when the plurality of divided members are assembled into an assembled body.

2. Assembling Step S20

In the assembling step S20, as shown in FIG. 5, the plurality of divided members 22, 24 are assembled to each other in a state where the first metal member 10 is arranged in the first metal member accommodating portion 28 thus forming an assembled body 30.

3. Bonding Step S30

In the bonding step S30, as shown in FIG. 6, by applying a first temperature and a first pressure OP at which the respective metal materials can be bonded to each other to the assembled body 30 (see FIG. 6A), the plurality of divided members 22, 24 are bonded to each other thus forming the second metal member 20, and the first metal member 10 and the second metal member 20 are also bonded to each other (see FIG. 6B).

The first pressure OP is a pressure which enables the plurality of divided members 22, 24 to be bonded to each other and to resist against the thermal expansion of the first metal member 10.

The first metal member 10 and the second metal member 20 are bonded to each other on a plane where the first metal member 10 and the second metal member 20 face each other in an opposed manner due to a second pressure IP generated because of the difference in linear expansion coefficient between first metal and second metal.

In the bonding step S30, the first pressure OP is applied to the assembled body 30 in the direction perpendicular to the plane (see FIG. 6A). A computer-controlled hydraulic press is used for applying such a pressure to the assembled body 30.

In the bonding step S30, the bonding is performed such that the pressure which the assembled body 30 receives becomes a fixed value. A fixed pressure can beset to 5 MPa, for example. Further, a first temperature is a temperature lower than a melting point of first metal and a melting point of second metal.

The bonding step S30 is carried out under a vacuum condition, for example.

By carrying out the above-mentioned respective steps, the above-mentioned composite metal material 1 can be manufactured.

As other steps which follow the bonding step S30, a step of applying working to the composite metal material 1, a step of enhancing hardness of the second metal member 20 by quenching and the like may be also carried out.

Hereinafter, the method of manufacturing a composite metal material of the embodiment 1 and advantageous effects of the composite metal material 1 are explained.

According to the method of manufacturing a composite metal material of the embodiment 1, the method includes the metal member preparation step S10, the assembling step S20 and the bonding step S30 in this order and hence, in the bonding step, the second metal member can be formed by bonding the plurality of divided members to each other, and the first metal member 10 and the second metal member 20 can be also bonded to each other with the second pressure generated due to the difference in linear expansion coefficient between first metal and second metal. Accordingly, it is possible to manufacture the useful composite metal material which has not existed in the past where the first metal member is enclosed by the second metal member, and the first metal member and the second metal member are bonded to each other.

According to the method of manufacturing a composite metal material of the embodiment 1, the first metal member 10 made of first metal and the second metal member 20 made of second metal having a smaller linear expansion coefficient than first metal are used. Accordingly, by merely applying a pressure to the assembled body from the outside in the bonding step, the first metal member 10 which is expanded by heat applies a pressure to the second metal member 20 from the inside so that the first metal member 10 and the second metal member 20 can be bonded to each other.

According to the method of manufacturing a composite metal material of the embodiment 1, the first metal member 10 and the second metal member 20 are bonded to each other and hence, compared to a case where the first metal member 10 and the second metal member 20 are merely in contact with each other, the strength of the manufactured composite metal material can be enhanced and, further, heat, electricity and the like can be smoothly transmitted from the second metal member 20 to the first metal member 10.

According to the method of manufacturing a composite metal material of the embodiment 1, the first pressure is a pressure which enables the plurality of divided members 22, 24 to be bonded to each other and to resist against the thermal expansion of the first metal member 10. Accordingly, the second metal member 20 can be formed by bonding the plurality of divided members 22, 24 to each other, and the first metal member 10 and the second metal member 20 can be also bonded to each other.

According to the method of manufacturing a composite metal material of the embodiment 1, the plurality of divided members 22, 24 which are divided along a plane parallel to each other are prepared as the plurality of divided members 22, 24 in the metal member preparation step S10, and the first pressure is applied to the assembled body 30 in a direction perpendicular to the plane in the bonding step S30. Accordingly, the composite metal material can be manufactured easily compared to a case where a pressure is applied to the assembled body 30 from all directions.

According to the method of manufacturing a composite metal material of the embodiment 1, the bonding is performed in the bonding step S30 such that a pressure which the assembled body 30 receives becomes a fixed value. Accordingly, a composite metal material having stable quality can be manufactured.

According to the method of manufacturing a composite metal material of the embodiment 1, the first temperature is lower than a melting point of first metal and a melting point of second metal in the bonding step S30. Accordingly, it is possible to bond the first metal member 10 and the second metal member 20 to each other by solid phase diffusion bonding without melting the first metal member 10 and the second metal member 20. As a result, compared to a case where bonding is performed by melting metal as in the case of welding, a residual stress which remains in the composite metal material after bonding can be largely decreased.

According to the method of manufacturing a composite metal material of the embodiment 1, the bonding step S30 is carried out under a vacuum condition. Accordingly, the oxidization of the metal member can be prevented.

According to the method of manufacturing a composite metal material of the embodiment 1, the bonding step S30 is carried out under a vacuum condition. Accordingly, even when a gap exists between the metal members in the assembled body 30, it is possible to prevent lowering of a bonding force between the metal members.

The composite metal material 1 of the embodiment 1 is the composite metal material manufactured by the method of manufacturing a composite metal material of the embodiment 1 and hence, it is possible to provide a useful composite metal material which has not existed in the past.

The composite metal material 1 of the embodiment 1 includes the first metal member 10 made of first metal, and the second metal member 20 made of second metal having a smaller linear expansion coefficient than first metal, wherein the second metal member 20 encloses the first metal member 10, and the first metal member 10 and the second metal member 20 are bonded to each other on a plane where the first metal member 10 and the second metal member 20 face each other in an opposed manner. Accordingly, it is possible to provide a composite metal material which has not existed in the past.

In the composite metal material 1 of the embodiment 1, the first metal member 10 and the second metal member 20 are bonded to each other and hence, it is possible to provide a state where no clear boundary exists between the first metal member and the second metal member. Accordingly, it is possible to increase the strength of the manufactured composite metal material. Further, continuity in property is ensured between the members and hence, heat, electricity or the like can be smoothly transmitted between the members.

Embodiment 2

Figure 7A:
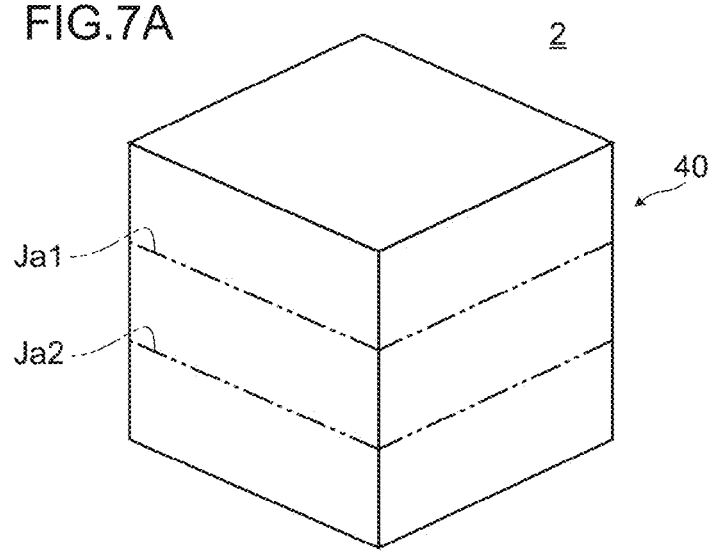
FIG. 7A to FIG. 7C are views for explaining a composite metal material of an embodiment 2.
Figure 7B:
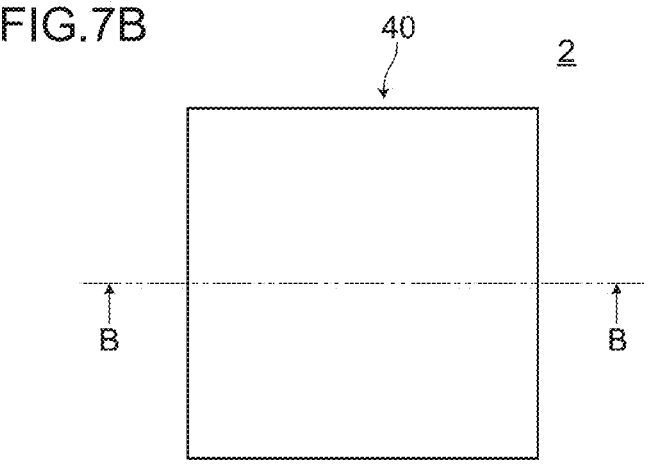
Figure 7C:
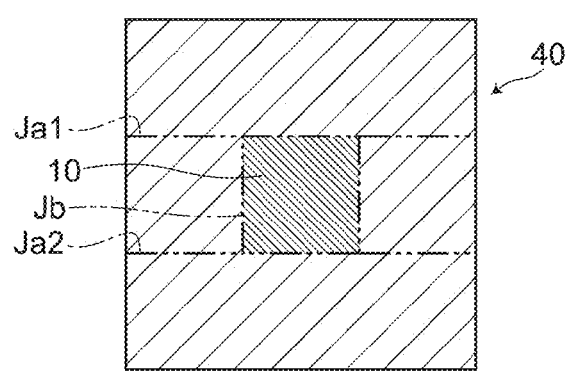

FIG. 7A to FIG. 7C are views for explaining a composite metal material 2 of the embodiment 2. FIG. 7A is a perspective view of the composite metal material 2, FIG. 7B is a top plan view of the composite metal material 2, and FIG. 7C is a cross-sectional view taken along a line B-B in FIG. 7B.

Figure 8A:
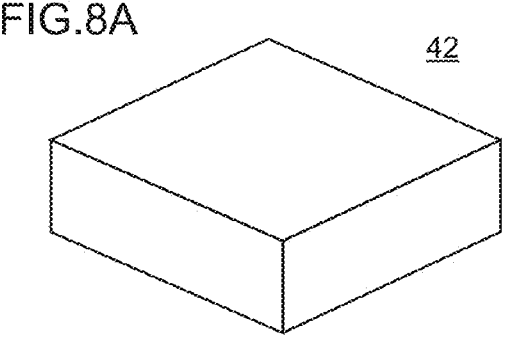
FIG. 8A to FIG. 8G are views for explaining a plurality of divided members used in the embodiment 2.
Figure 8B:
Figure 8C:
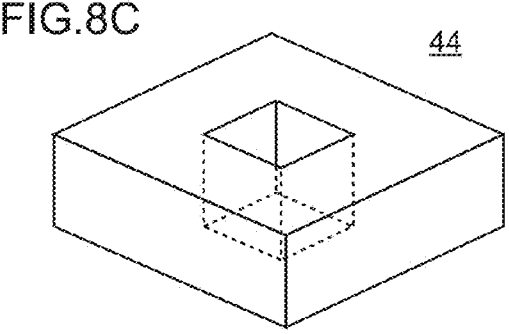
Figure 8D:
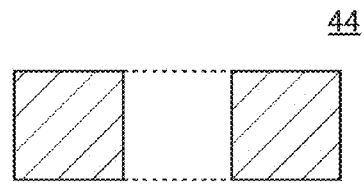
Figure 8E:
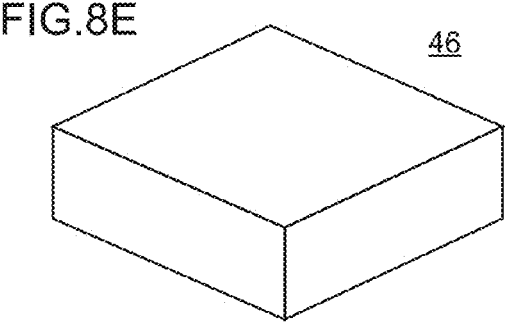
Figure 8F:
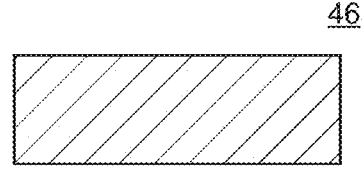
Figure 8G:
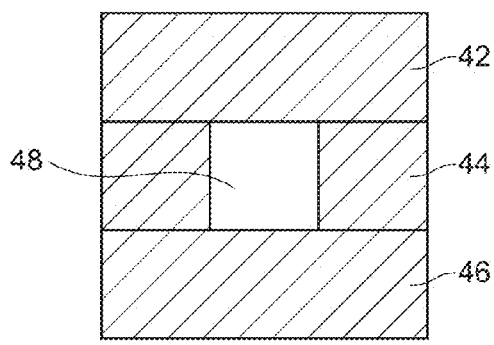
Figure 9A:
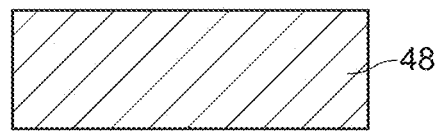
FIG. 9A to FIG. 9D are views for explaining an assembling step in the embodiment 2.
Figure 9B:
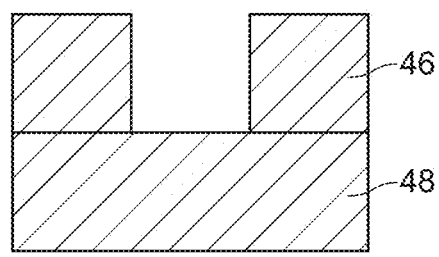
Figure 9C:
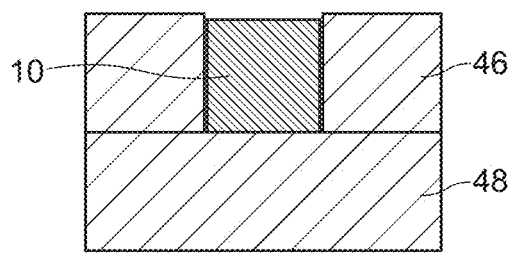
Figure 9D:
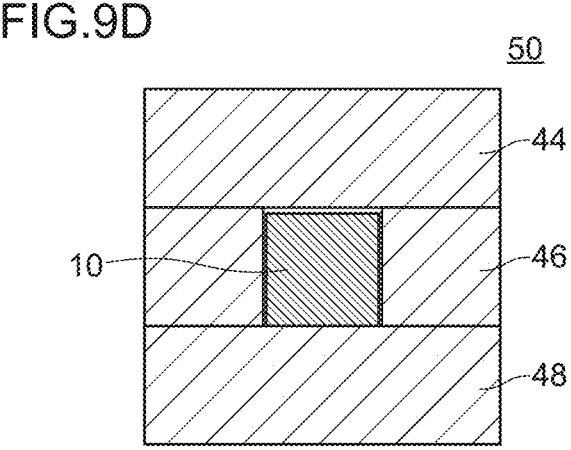

FIG. 8A to FIG. 8F are views for explaining a plurality of divided members 42, 44, 46 used in the embodiment 2. FIG. 8A is a perspective view of the divided member 42, FIG. 8B is a cross-sectional view of the divided member 42, FIG. 8C is a perspective view of the divided member 44, FIG. 8D is a cross-sectional view of the divided member 44, FIG. 8E is a perspective view of the divided member 46, FIG. 8F is a cross-sectional view of the divided member 46, and FIG. 8G is a cross-sectional view showing a state where only the plurality of divided members 42, 44, 46 are assembled to each other. The cross-sectional views shown in FIG. 8 are cross-sectional views corresponding to FIG. 7C.

FIG. 9A to FIG. 9D are views for explaining an assembling step S22 in the embodiment 2. FIG. 9A to FIG. 9D are views showing the manner of assembling an assembled body 50. FIG. 9A to FIG. 9D are views corresponding to FIG. 7C.

Figure 10A:
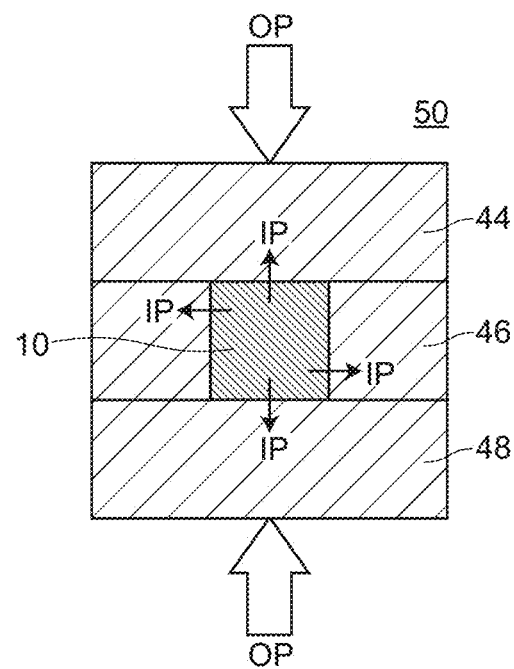
FIG. 10A and FIG. 10B are views for explaining a bonding step in the embodiment 2.
Figure 10B:
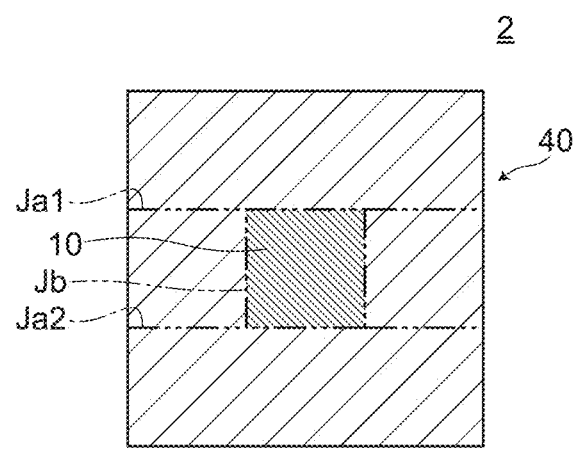

FIG. 10A and FIG. 10B are views for explaining a bonding step S32 in the embodiment 2. FIG. 10A is a cross-sectional view showing a state where a first temperature and a first pressure OP are applied to the assembled body 50, and FIG. 10B is a cross-sectional view of the assembled body 50 after the bonding step S32 is carried out (that is, a view of the composite metal material 2). FIG. 10A and FIG. 10B are cross-sectional view corresponding to FIG. 7C.

The method of manufacturing a composite metal material of the embodiment 2 is basically equal to the method of manufacturing a composite metal material of the embodiment 1. However, the method of manufacturing a composite metal material of the embodiment 2 differs from the method of manufacturing a composite metal material of the embodiment 1 with respect to a point that a plurality of divided members which constitute a second metal member is formed of three divided members. Hereinafter, the method of manufacturing a composite metal material and the composite metal material 2 of the embodiment 2 are explained mainly with respect to the point which makes the method of manufacturing a composite metal material and a composite metal material 2 of the embodiment 2 different from the method of manufacturing a composite metal material and the composite metal material 1 of the embodiment 1.

As shown in FIG. 7A to FIG. 7C, the composite metal material 2 of the embodiment 2 basically has the same constitution as the composite metal material 1 of the embodiment 1 such that the composite metal material 2 includes a first metal member 10 made of first metal and a second metal member 40. Although the second metal member 40 of the composite metal material 2 differs from the second metal member 20 of the embodiment 1 with respect to the constitution of the plurality of divided members, FIG. 7 shows a state of the second metal member 40 after the plurality of divided members are bonded to each other and the first metal member 10 and the second metal member 40 are bonded to each other and hence, the second metal member 40 basically has the same constitution as the second metal member 20 of the embodiment 1.

In FIG. 7, symbol Jb indicates a bonded portion between the first metal member 10 and the second metal member 40, and symbols Ja1, Ja2 indicate bonded portions between the divided members 42, 44, 46 (described later) which constitute the second metal member 20. The bonded portions Ja1, Ja2 are portions where metals of the same kind are bonded to each other and hence, it is not always the case that a line shown in FIG. 7A can be visually recognized in an actually manufactured composite metal material.

Next, the method of manufacturing a composite metal material of the embodiment 2 is explained.

The method of manufacturing a composite metal material of the embodiment 2 is a method of manufacturing a composite metal material 2 which includes the first metal member 10 made of first metal and the second metal member 40 made of second metal having a smaller linear expansion coefficient than first metal. The manufacturing method includes: a metal member preparation step S12; an assembling step S22; and a bonding step S32 in this order. The metal member preparation step S12 is basically equal to the metal member preparation step S10 in the embodiment 1, the assembling step S22 is basically equal to the assembling step S20 in the embodiment 1, and the bonding step S32 is basically equal to the bonding step S30 in the embodiment 1. Hereinafter, the explanation is made with respect to points which make the respective steps of the embodiment 2 different from the corresponding steps of the embodiment 1.

1. Metal Member Preparation Step S12

In the metal member preparation step S12, as shown in FIG. 8, the first metal member 10 (see FIG. 3) and the plurality of divided members 42, 44, 46 made of second metal are prepared. The plurality of divided members 42, 44, 46 form a first metal member accommodating portion 48 which encloses the first metal member 10 when the divided members 42, 44, 46 are assembled to each other (see FIG. 8).

In the metal member preparation step S12, as the plurality of divided members 42, 44, 46, a plurality of divided members which are divided along a predetermined plane parallel to each other are prepared. The predetermined plane in the embodiment 2 is a plane perpendicular to a cross section taken along a line B-B in FIG. 7C.

2. Assembling Step S22

In the assembling step S22, as shown in FIG. 9, the plurality of divided members 42, 44, 46 are assembled to each other in a state where the first metal member 10 is arranged in the first metal member accommodating portion 48 thus forming an assembled body 50.

3. Bonding Step S32

In the bonding step S32, as shown in FIG. 10, by applying a first temperature and a first pressure OP to the assembled body 50, the plurality of divided members 42, 44, 46 are bonded to each other thus forming the second metal member 40, and the first metal member 10 and the second metal member 40 are also bonded to each other.

By carrying out the above-mentioned respective steps, the composite metal material 2 of the embodiment 2 can be manufactured.

Hereinafter, the explanation is made with respect to advantageous effects acquired by the method of manufacturing a composite metal material and the composite metal material 2 of the embodiment 2.

The method of manufacturing a composite metal material of the embodiment 2 differs from the method of manufacturing a composite metal material of the embodiment 1 with respect to a point that the plurality of divided members which constitute the second metal member are formed of three divided members. However, the method of manufacturing a composite metal material of the embodiment 2 includes the metal member preparation step S12, the assembling step S22 and the bonding step S32 in this order. Accordingly, in the same manner as the method of manufacturing a composite metal material of the embodiment 1, in the bonding step, the second metal member can be formed by bonding the plurality of divided members to each other, and the first metal member and the second metal member can be also bonded to each other with the second pressure generated due to the difference in linear expansion coefficient between first metal and second metal. Accordingly, it is possible to manufacture a useful composite metal material which has not existed in the past where the first metal member is enclosed by the second metal member, and the first metal member and the second metal member are bonded to each other.

The method of manufacturing a composite metal material of the embodiment 2 is substantially equal to the method of manufacturing a composite metal material of the embodiment 1 except for a point that the plurality of divided members which constitute the second metal member are formed of three divided members and hence, the method of manufacturing a composite metal material of the embodiment 2 can acquire the same advantageous effects as the method of manufacturing a composite metal material of the embodiment 1.

The composite metal material 2 of the embodiment 2 differs from the composite metal material 1 of the embodiment 1 with respect to a method of manufacturing a composite metal material. However, the composite metal material 2 of the embodiment 2 is a composite metal material manufactured by the method of manufacturing a composite metal material of the embodiment 2 and hence, in the same manner as the composite metal material 1 of the embodiment 1, it is possible to provide a useful composite metal material which has not existed in the past.

That is, the composite metal material 2 of the embodiment 2 has the substantially same constitution as the composite metal material 1 of the embodiment 1 except for a method of manufacturing a composite metal material and hence, the composite metal material 2 of the embodiment 2 can acquire the same advantageous effects as the composite metal material 1 of the embodiment 1.

Embodiment 3

Figure 11A:
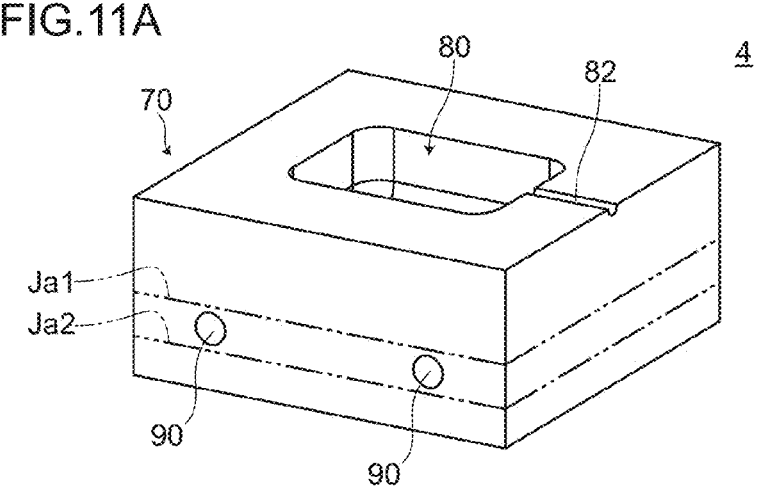
FIG. 11A to FIG. 11C are views for explaining a mold used in an embodiment 3.
Figure 11B:
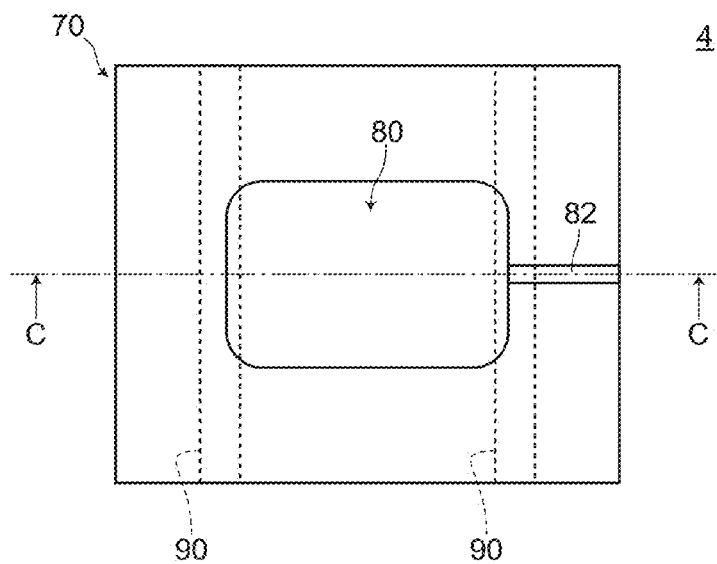
Figure 11C:
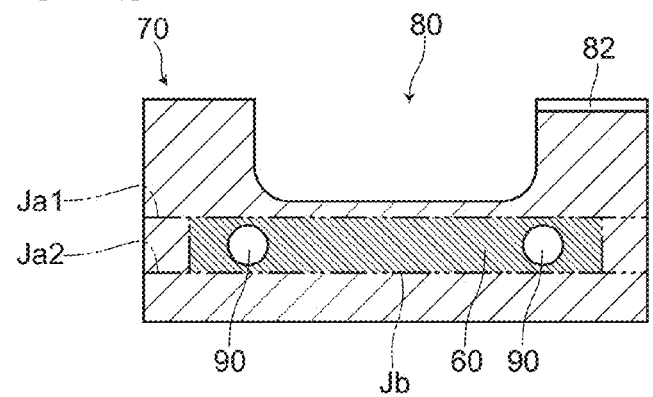

FIG. 11A and FIG. 11B are views for explaining a mold 4 of the embodiment 3. FIG. 11A is a perspective view of the mold 4, FIG. 11B is a top plan view of the mold 4, and FIG. 11C is a cross-sectional view taken along a line C-C in FIG. 11B.

Figure 12A:
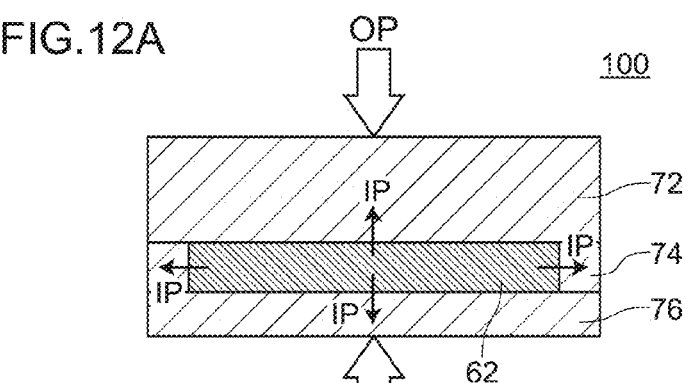
FIG. 12A to FIG. 12D are views for explaining a method of manufacturing a mold of the embodiment 3.
Figure 12B:
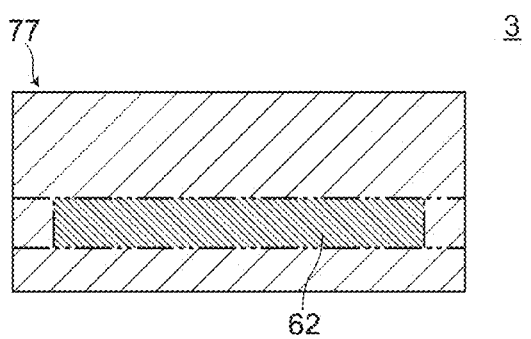
Figure 12C:
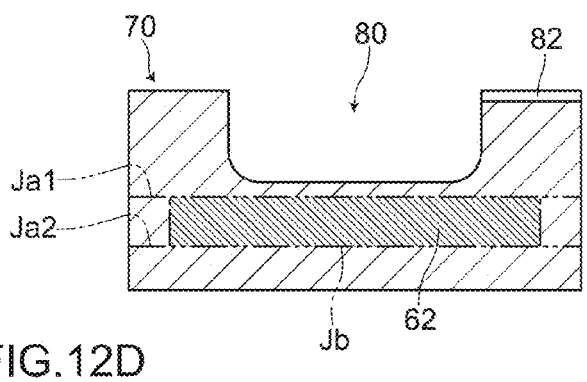
Figure 12D:
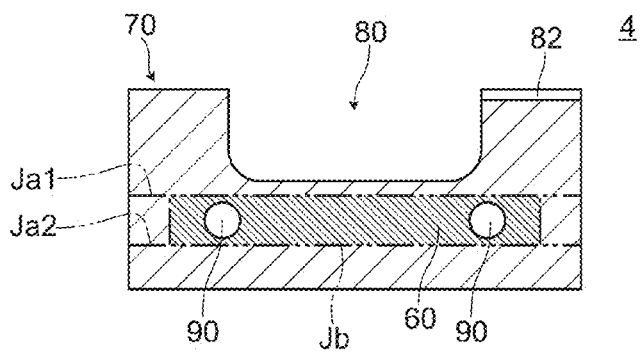

FIG. 12A to FIG. 12D are views for explaining a method of manufacturing a mold of the embodiment 3. FIG. 12A is the view of a bonding step S34 in a composite metal material manufacturing step S40, FIG. 12B shows a composite metal material 3 prepared in the composite metal material manufacturing step, and FIG. 12C and FIG. 12D are views for explaining a recessed portion forming step S50. FIG. 12A to FIG. 12D are cross-sectional views corresponding to FIG. 11C.

Firstly, the mold 4 which is manufactured by the method of manufacturing a mold of the embodiment 3 is explained.

The mold 4 is a mold of a type which is used in combination with the other mold or other molds (not shown in the drawing). As shown in FIG. 11, the mold 4 includes: a first metal member 60 made of first metal, a second metal member 70 made of second metal having a smaller linear expansion coefficient than first metal; a recessed portion 80 which forms a cavity when the mold 4 is combined with the other mold or other molds; a groove portion 82 which forms a runner when the mold 4 is combined with the other mold or other molds; and heat exchange medium flow paths 90 which are formed such that the heat exchange medium flow paths penetrate portions formed of the first metal member 60.

In the embodiment 3, first metal has a higher thermal conductivity than second metal, and the thermal conductivity of first metal at a room temperature is 50 W/(m·K) or above. To be more specific, first metal is copper which has thermal conductivity of 398 W/(m·K), while second metal is die steel which has thermal conductivity of approximately 25 W/(m·K).

Next, the method of manufacturing a mold of the embodiment 3 is explained.

The method of manufacturing a mold of the embodiment 3 includes: the composite metal material manufacturing step S40; and a recessed portion forming step S50 in this order.

In the composite metal material manufacturing step S40, the composite metal material 3 is manufactured by the method of manufacturing a composite metal material according to the present invention. In the embodiment 3, the composite metal material 3 is manufactured by the substantially same method as the method of manufacturing a composite metal material of the embodiment 2 (see FIG. 12A and FIG. 12B). The difference between the method of manufacturing a composite metal material of the embodiment 3 and the method of manufacturing a composite metal material of the embodiment 21 lies only in sizes of respective parts and hence, the detailed explanation of the method of manufacturing a composite metal material of the embodiment 3 is omitted.

In the recessed portion forming step S50, a recessed portion 80 which forms a cavity when the mold 4 is combined with the other mold or other molds is formed in a portion of the composite metal material 3 which constitutes the second metal member 70 (see FIG. 12C). In the recessed portion forming step S50, a groove portion 82 which forms a runner when the mold 4 is combined with the other mold or other molds, and heat exchange medium flow paths 90 are also formed (see FIG. 12D). The heat exchange medium flow paths 90 are formed such that the heat exchange medium flow paths 90 penetrate portions formed of the first metal member 60. In the embodiment 3, the heat exchange medium flow paths 90 are formed such that the heat exchange medium flow paths 90 penetrate the first metal member 60.

The recessed portion 80, the groove portion 82 and the heat exchange medium flow paths 90 can be formed using various cutting tools, various boring tools, various polishing tools or the like, for example.

In the method of manufacturing a mold of the embodiment 3, the heat exchange medium flow path 90 is formed of a simple through hole (see FIG. 11B). However, the heat exchange medium flow path may be formed in a U shape thus allowing the flow path to be formed only in the inside of the mold.

As other steps which follow the recessed portion forming step S50, when necessary, a step of applying additional working to the mold 4 (for example, a polishing step or a step of changing hardness of a mold surface) may be carried out.

According to the method of manufacturing a mold of the embodiment 3, the method includes the composite metal material manufacturing step S40 where the composite metal material 3 is manufactured by the method of manufacturing a composite metal material according to the present invention. Accordingly, it is possible to manufacture a mold using a useful composite metal material which has not existed in the past.

According to the method of manufacturing a mold of the embodiment 3, the first metal member 60 made of metal having high thermal conductivity, and the second metal member 70 made of metal having excellent strength are used in manufacturing the mold and hence, it is possible to manufacture a mold which possesses both the excellent thermal conductivity and the excellent strength.

According to the method of manufacturing a mold of the embodiment 3, first metal has the higher thermal conductivity than second metal, and the thermal conductivity of first metal at a room temperature is 50 W/(m·K) or above and hence, it is possible to manufacture a mold which is particularly excellent in thermal conductivity.

According to the method of manufacturing a mold of the embodiment 3, the heat exchange medium flow paths 90 are formed such that the heat exchange medium flow paths 90 penetrate portion formed of the first metal member in the recessed portion forming step S50 and hence, a heat exchange of a manufactured mold can be easily performed.

That is, according to the method of manufacturing a mold of the embodiment 3, the heat exchange medium flow paths 90 are formed in the first metal member 60 having high thermal conductivity. Accordingly, a heat exchange effect generated by the heat exchange medium is speedily transmitted to the whole mold and hence, a temperature of the whole mold can be speedily changed whereby it is possible to manufacture a mold whose temperature control can be performed accurately and uniformly.

Embodiment 4

Figure 13A:
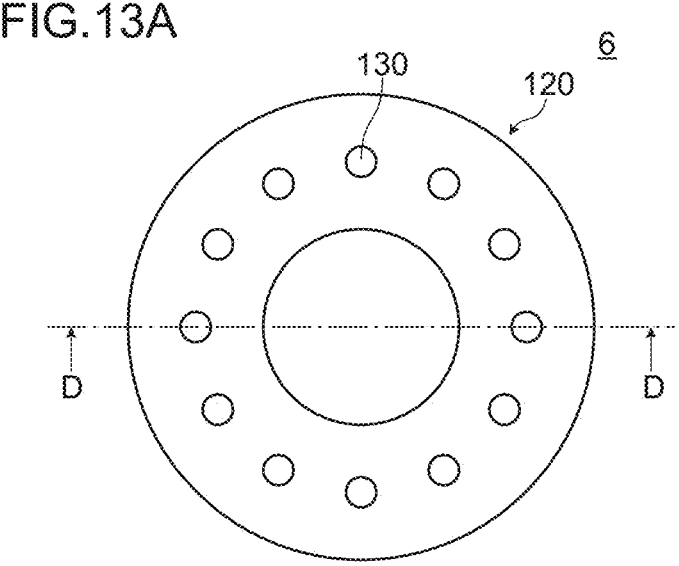
FIG. 13A to FIG. 13C are views for explaining a metal product used in an embodiment 4.
Figure 13B:
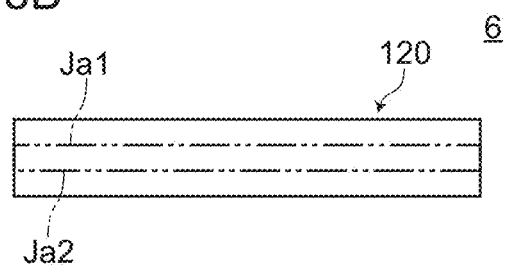
Figure 13C:
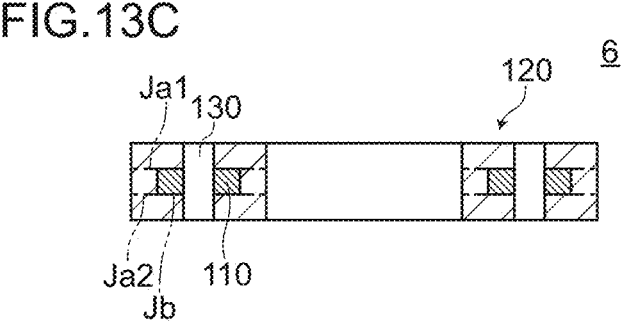

FIG. 13A to FIG. 13C are views for explaining a metal product 6 of the embodiment 4. FIG. 13A is a front view of the metal product 6, FIG. 13B is a side view of the metal product 6, and FIG. 13C is a cross-sectional view taken along a line D-D in FIG. 13A.

Figure 14:
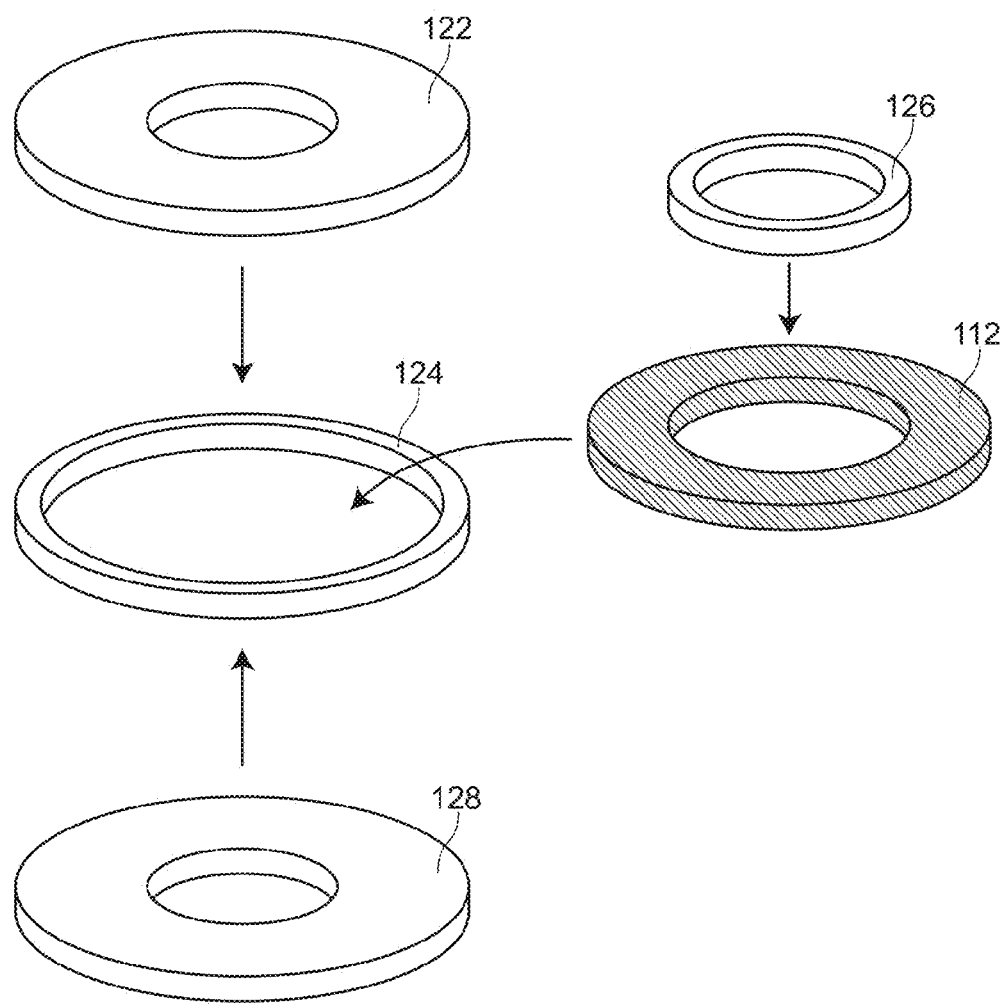
FIG. 14 is a view for explaining a composite metal material manufacturing step in the embodiment 4.

FIG. 14 is a view for explaining a composite metal material manufacturing step S42 in the embodiment 4. In FIG. 14, arrows indicate the manner of assembling the composite metal material in a simplified manner.

Figure 15A:
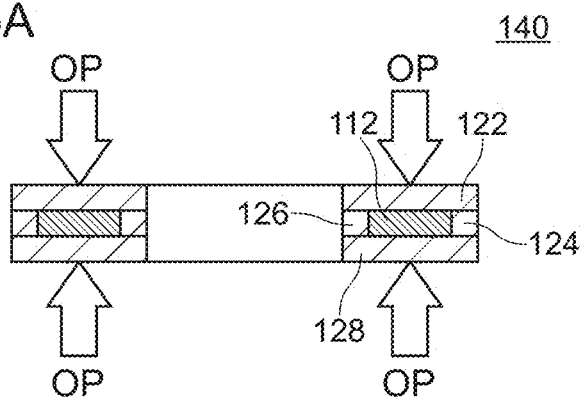
FIG. 15A to FIG. 15C are views for explaining a composite metal material manufacturing step and a working step in the embodiment 4.
Figure 15B:
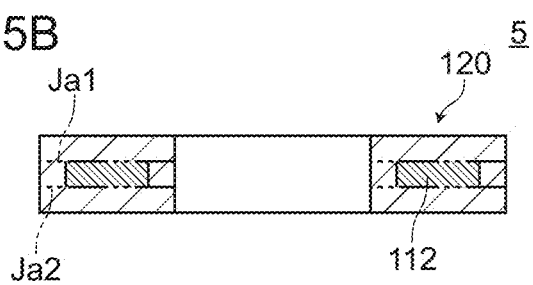
Figure 15C:
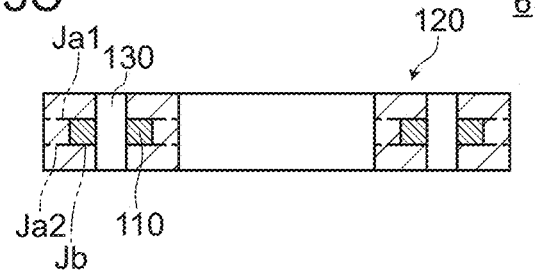

FIG. 15A to FIG. 15C are views for explaining the composite metal material manufacturing step S42 and a working step S52 in the embodiment 4. FIG. 15A is a view of a bonding step S36 in the composite metal material manufacturing step S42, FIG. 15B shows a composite metal material 5 prepared in the composite metal material manufacturing step S42, and FIG. 15C is a view for explaining working step S52. In FIG. 15A, in view of a space in the drawing, a second pressure IP is nod described in the drawing. FIG. 15A to FIG. 15C are cross-sectional views corresponding to FIG. 13C.

Firstly, the metal product 6 manufactured by the method of manufacturing a metal product of the embodiment 4 is explained.

The metal product 6 is a metal product of a type which can be used as a brake rotor. As shown in FIG. 13, the metal product 6 includes: a first metal member 110 made of first metal; a second metal member 120 made of second metal having a smaller linear expansion coefficient than first metal; and a ventilation hole 130 which is formed such that the ventilation hole 130 penetrates the first metal member 110 and the second metal member 120.

Next, the method of manufacturing a metal product of the embodiment 4 is explained.

The method of manufacturing a metal product of the embodiment 4 includes: the composite metal material manufacturing step S42; and the working step S52 in this order.

In the composite metal material manufacturing step S42, the composite metal material 5 is manufactured by the method of manufacturing a composite metal material according to the present invention. In the embodiment 4, firstly, as shown in FIG. 14, a first metal member 112 having a disc shape and a plurality of divided members 122, 124, 126, 128 also having a disc shape are prepared (metal member preparation step S14). First metal and second metal in the embodiment 4 are substantially equal to first metal and second metal used in the embodiment 3.

Next, the plurality of divided members 122, 124, 126, 128 are assembled to each other in a state where the first metal member 112 is arranged in a first metal member accommodating portion thus forming an assembled body 140 (assembling step S24). Thereafter, the composite metal material 5 is prepared by the substantially same method as the method of manufacturing a composite metal material of the embodiment 2, (bonding step S36, see FIG. 15A and FIG. 15B). The difference between the method of manufacturing a composite metal material of the embodiment 4 and the method of manufacturing a composite metal material of the embodiment 2 lies only in shapes of respective parts and hence, the detailed explanation of the method of manufacturing a composite metal material of the embodiment 4 is omitted.

In the working step S52, the metal product 6 is manufactured by working the composite metal material 5 (see FIG. 15C). In the working step S52, the ventilation hole 130 is formed such that the ventilation hole 130 penetrates the first metal member 112. The ventilation hole 130 can be formed by using various cutting tools, various boring tools, various polishing tools or the like, for example.

In the method of manufacturing a mold of the embodiment 4, the ventilation hole 130 is formed of a straight through hole. However, an amount of air which passes through the inside of the metal product may be increased by forming the ventilation hole in an oblique shape or in a curved shape.

According to the method of manufacturing a metal product of the embodiment 4, the method includes the composite metal material manufacturing step S42 where the composite metal material 5 is manufactured by the method of manufacturing a composite metal material according to the present invention. Accordingly, it is possible to manufacture a metal product using a useful composite metal material which has not existed in the past.

According to the method of manufacturing a metal product of the embodiment 4, the metal product 6 is a brake rotor which is formed by working the composite metal material 5 manufactured by the method of manufacturing a composite metal material according to the present invention. Accordingly, thermal conductivity of the brake rotor manufactured by the method of manufacturing a metal product of the embodiment 4 can be extremely increased compared with thermal conductivity of a brake rotor formed of a single metal plate. Further, in the brake rotor manufactured by the method of manufacturing a metal product of the embodiment 4, tip ends of a bonded portion between the first metal member and the second metal member are not exposed to the outside and hence, strength of the brake rotor can be increased compared with a brake rotor which is formed of a conventional composite metal material manufactured by merely laminating and bonding metal plates.

Example 1

Figure 16A:
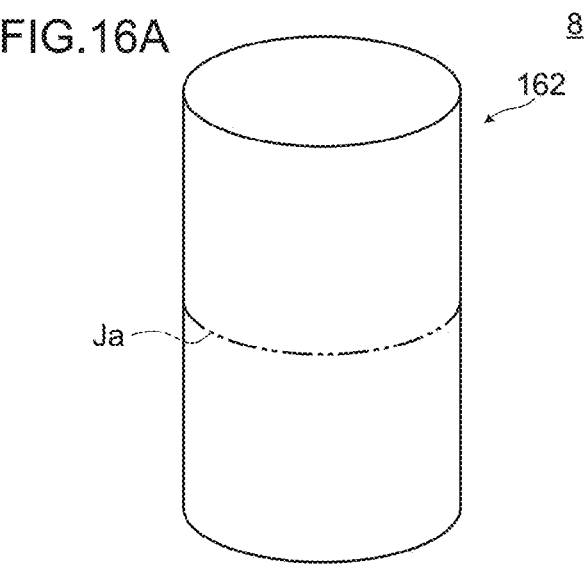
FIG. 16A to FIG. 16C are views for explaining a composite metal material used in an example 1.
Figure 16B:
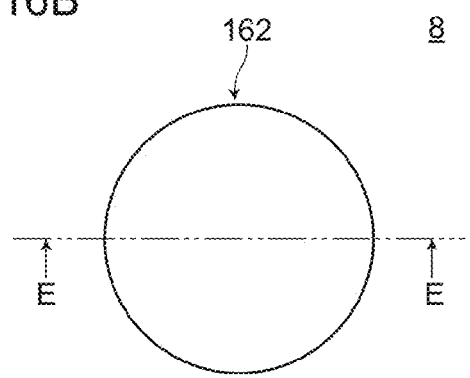
Figure 16C:
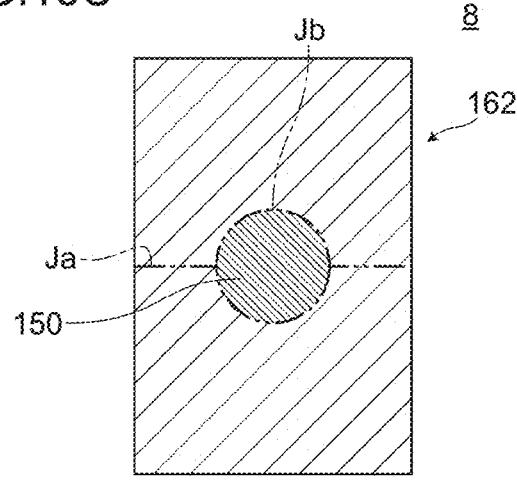

FIG. 16A to FIG. 16C are views for explaining a composite metal material 8 of an example 1. FIG. 16A is a perspective view of the composite metal material 8, FIG. 16B is a top plan view of the composite metal material 8, and FIG. 16C is a cross-sectional view taken along a line E-E in FIG. 16B. The composite metal material 8 is a material for manufacturing a metal product 7 of the example 1.

Figure 17A:
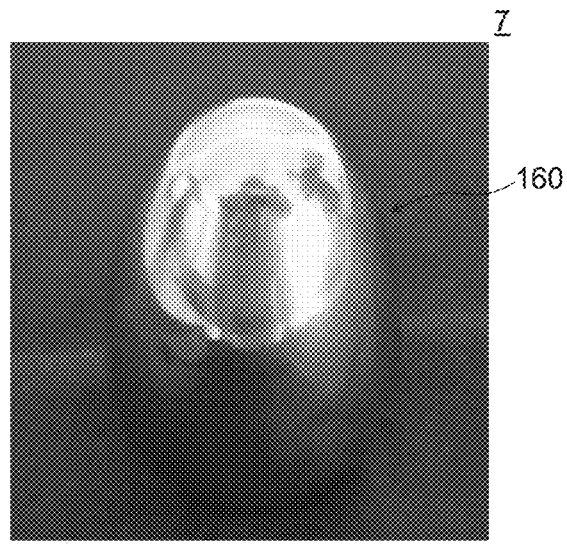
FIG. 17A to FIG. 17C are photographs for explaining a metal product of the example 1.
Figure 17B:
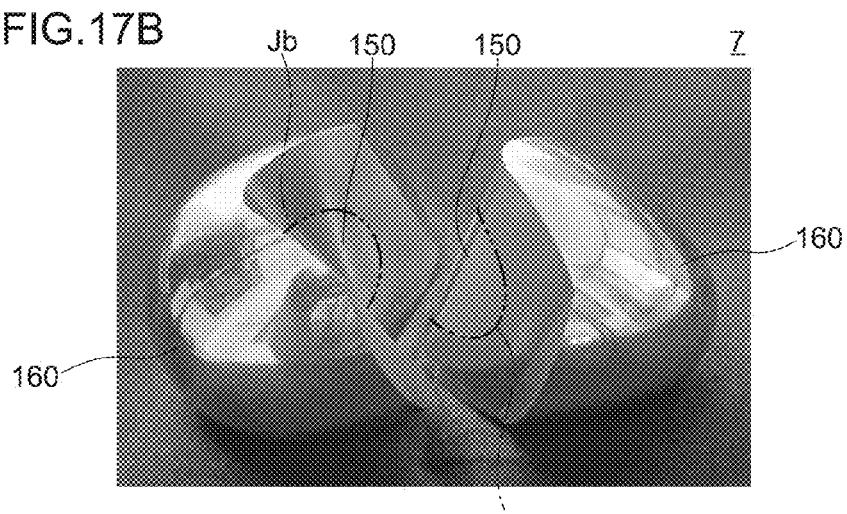
Figure 17C:
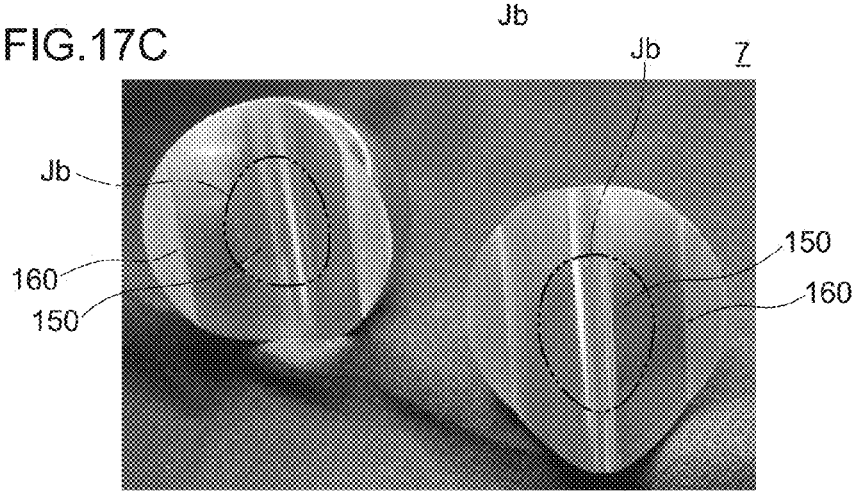

FIG. 17A to FIG. 17C are photographs for explaining the metal product 7 of the example 1. FIG. 17A is the photograph showing the metal product 7 before cutting, and FIG. 17B and FIG. 17C are the photographs showing the metal product 7 after cutting. In FIG. 17B and FIG. 17C, a broken line is an auxiliary line indicating a bonded portion Jb between the first metal member 150 and the second metal member 160, and such a line is not drawn on an actual metal product 7.

In the example 1, the metal product (metal product 7) according to the present invention is actually manufactured.

Firstly, in a composite metal material manufacturing step, the composite metal material 8 shown in FIG. 16 is manufactured. Although shapes of the respective metal members differ from each other, the method of manufacturing a composite metal material of the example 1 is basically equal to the method of manufacturing a composite metal material of the embodiment 1 and hence, the explanation of the method of manufacturing a composite metal material of the example 1 is omitted.

In FIG. 16, a second metal member indicated by symbol 162 is a second metal member before working is applied to the second metal member in the working step. The first metal member 150 has a spherical shape with a diameter of approximately 25 mm, and the second metal member has a columnar shape with a diameter of approximately 50 mm and a height of approximately 150 mm.

First metal is copper and second metal is stainless steel (SUS420J2, linear expansion coefficient: approximately $11.7 \times 10^{-6}$/K).

Next, the composite metal material 8 is formed into an egg shape by cutting in the working step thus manufacturing the metal product 7. A height (distance from a bottom end to a distal end) of the metal product 7 is set to 69 mm, and a maximum diameter of the metal product 7 is set to 46 mm. After the egg-shaped metal product 7 (see FIG. 17A) is manufactured by the above-mentioned manufacturing method, the metal product 7 is cut using wire electric discharge machining so as to observe the inside of the metal product 7 (see FIG. 17B and FIG. 17C). In FIG. 17, symbol 150 indicates the first metal member, and symbol 160 indicates the second metal member.

The metal product 7 manufactured in the above-mentioned manner has, as shown in FIG. 17, the external appearance of a metal-made hard-boiled egg where the first metal member 150 made of copper looks like a yolk and the second metal member 160 made of stainless steel looks like an egg white. The first metal member 150 and the second metal member 160 are bonded to each other and hence, there exists no possibility that the first metal member 150 is removed from the second metal member 160 constituting the yolk. That is, the metal product 7 is an ornamental product which is excellent in appearance and strength.

Example 2

Figure 18A:
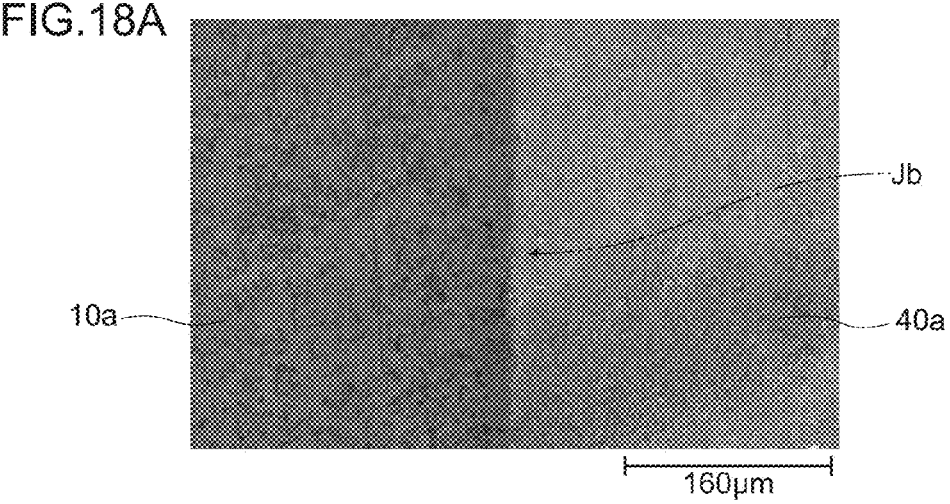
FIG. 18A to FIG. 18C are photograph showing a bonded portion between a first metal member and a second metal member of an example 2 in an enlarged manner.
Figure 18B:
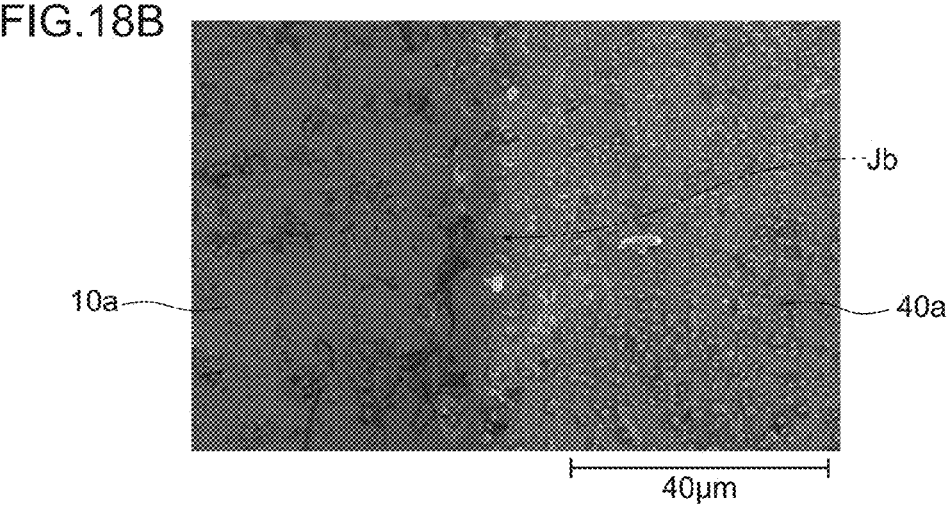
Figure 18C:
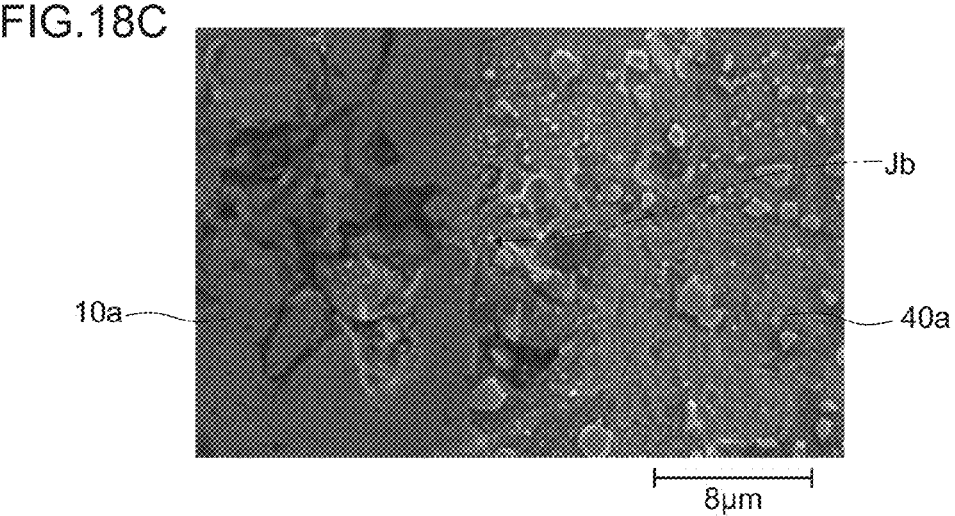

FIG. 18A and FIG. 18B are photographs showing a bonded portion Jb between a first metal member 10a and a second metal member 40a in the example 2 in an enlarged manner. FIG. 18A is a photograph showing the bonded portion Jb and an area around the bonded portion Jb in an enlarged manner at a magnification of 200 times, FIG. 18B is a photograph showing the bonded portion Jb and the area around the bonded portion Jb in an enlarged manner at a magnification of 1000 times, and FIG. 18C is a photograph showing the bonded portion Jb and the area around the bonded portion Jb in an enlarged manner at a magnification of 3000 times.

In the example 2, a state of bonding between the first metal member and the second metal member is investigated.

In the example 2, a composite metal material 2a is manufactured by the substantially same method as the method of manufacturing a composite metal material of the embodiment 2, and the state of bonding between the first metal member 10a and the second metal member 40a is observed. First metal is copper and second metal is stainless steel (SUS420J2).

As a result, as shown in FIG. 18, in the composite metal material 2a of the example 2, it is confirmed that the first metal member 10a and the second metal member 40a are firmly bonded to each other by solid phase bonding in the vicinity of the bonded portion Jb.

Although the present invention has been explained in conjunction with the above-mentioned embodiments heretofore, the present invention is not limited to the above-mentioned embodiments. The present invention can be carried out in various modes without departing from the gist according to the present invention and, for example, the following modifications are also conceivable.

(1) The sizes, quantities, materials and shapes of the respective constitutional elements described in the above-mentioned respective embodiments merely constitute examples, and these factors can be changed within a range where advantageous effects according to the present invention are not damaged.

Figure 19A:
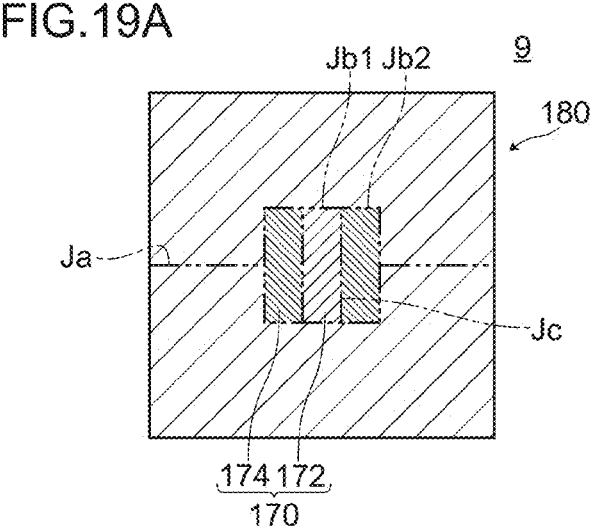
FIG. 19A and FIG. 19B are views for explaining a composite metal material of a modification.
Figure 19B:
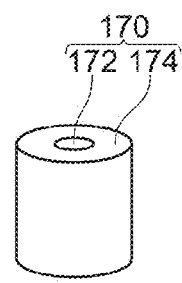
Figure 20A:
FIG. 20A to FIG. 20D are views for explaining a conventional method of manufacturing a composite metal material.
Figure 20B:
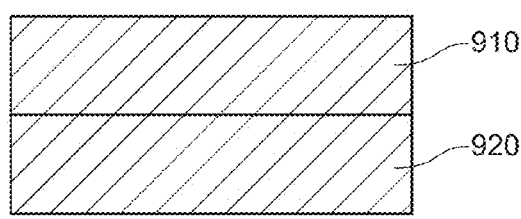
Figure 20C:
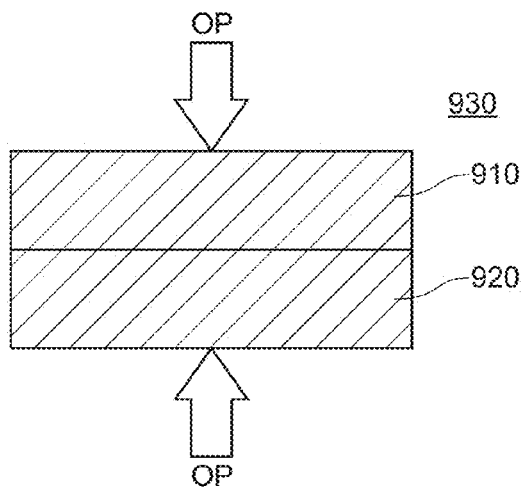
Figure 20D:
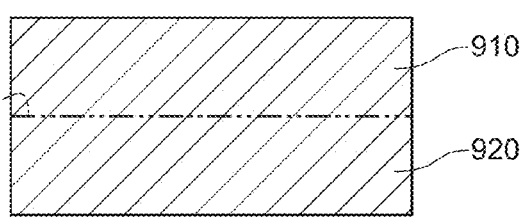

(2) In the above-mentioned respective embodiments, the first metal member is formed of a single metal member. However, the present invention is not limited to such a first metal member. FIG. 19A and FIG. 19B are view for explaining a composite metal material 9 of one modification. FIG. 19A is a cross-sectional view of the composite metal material 9, and FIG. 19B is a perspective view of a first metal member 170 formed in a metal member preparation step. FIG. 19A is a cross-sectional view corresponding to FIG. 1C. For example, as shown in FIG. 19A and FIG. 19B, the first metal member 170 formed of two kinds of first metal members 172, 174 may be used. In FIG. 19A, symbol Jb1 indicates a bonded portion between the first metal member 172 and the second metal member 180, symbol Jb2 indicates a bonded portion between the first metal member 174 and a second metal member 180, symbol Ja indicates a bonded portion between a plurality of divided members which constitute the second metal member 180, and symbol Jc indicates a bonded portion between the first metal members 172, 174 which constitute the first metal member 170. In the method of manufacturing a composite metal material according to the present invention, a first metal member formed of three or more kinds of metal members may be used. In this case, all first metal members may be made of first metal of the same kind, or first metals which differ from each other in kind may be used for forming the first metal members respectively.

(3) Also with respect to the plurality of divided members and second metal, provided that the condition where these materials have a smaller linear expansion coefficient than first metal is satisfied, all of the plurality of divided members may be made of second metal of the same kind, or second metals which are different from each other in kind may be used for forming the plurality of divided members respectively.

(4) In the above-mentioned embodiment 4 and the example 1, the explanation has been made with respect to the case where the metal product 6 is a brake rotor and the case where the metal product 7 is an ornamental product. However, the present invention is not limited to these cases. As a metal product which is manufactured by the method of manufacturing a metal product according to the present invention, besides the above-mentioned products, a cooling block (chill vent) for a mold, an engine cooling member or the like is considered. Further, it is also possible to manufacture a metal product having a unique electromagnetic property by using first metal and second metal which differ from each other in magnetic property.

(5) In the respective embodiments, the first pressure OP is applied to the assembled body from above and below. However, the present invention is not limited to the embodiments. For example, a first pressure may be applied to an assembled body from above in a state where a support base is arranged below the assembled body.

REFERENCE SIGNS LIST

1, 2, 3, 5, 8, 9: composite metal material, 4: mold, 6, 7: metal product, 10, 10*a*, 60, 62, 110, 112, 150, 170: first metal member, 20, 40, 40*a*, 70, 77, 120, 160, 180: second metal member, 22, 24, 42, 44, 46, 72, 74, 76, 122, 124, 126, 128: divided member, 28, 48: first metal member accommodating portion, 30, 50: assembled body, 80: recessed portion, 82: groove portion, 90: heat exchange medium flow path, 130: ventilation hole, 172, 174: metal member which constitutes first metal member, Ja, Ja1, Ja2: bonded portion between divided members, Jb, Jb1, Jb2: bonded portion between first metal member and second metal member, Jc: bonded portion between first metal members, OP: first pressure, IP: second pressure

The invention claimed is:

1. A method of manufacturing a composite metal material which includes a first metal member made of first metal and a second metal member made of second metal having a smaller linear expansion coefficient than first metal, the method comprising in the following order:
a metal member preparation step of preparing the first metal member, and a plurality of divided members which are made of second metal and form a first metal member accommodating portion capable of enclosing the first metal member when assembled to each other;
an assembling step of assembling the plurality of divided members to each other in a state where the first metal member is arranged in the first metal member accommodating portion thus forming an assembled body; and
a bonding step of, by applying a first temperature and a first pressure which enable the respective metal materials to be bonded to each other to the assembled body, bonding the plurality of divided members to each other thus forming the second metal member, and also of bonding the first metal member and the second metal member to each other,
wherein the respective divided members of the plurality of divided members are respectively separate pieces,
the first pressure is applied from the outside of the assembled body,
and the first metal member is expanded by the first temperature which causes the first metal member to expand outward against the second metal member, causing the first metal and second metal member to be bonded together.

2. The method of manufacturing a composite metal material according to claim 1, wherein a plurality of divided members which are divided along a plane parallel to each other are prepared as the plurality of divided members in the metal member preparation step; and
the first pressure is applied to the assembled body in a direction perpendicular to the plane in the bonding step.

3. The method of manufacturing a composite metal material according to claim 2, wherein the bonding is performed in the bonding step such that a pressure which the assembled body receives becomes a fixed value.

4. The method of manufacturing a composite metal material according to claim 1, wherein the first temperature is lower than a melting point of first metal and a melting point of second metal in the bonding step.

5. The method of manufacturing a composite metal material according to claim 1, wherein the bonding step is carried out under a vacuum condition.

6. A method of manufacturing a metal product comprising in the following order:
a composite metal material manufacturing step of manufacturing a composite metal material by the method of manufacturing a composite metal material according to claim 1; and
a working step of manufacturing a metal product by applying working to the composite metal material.

7. The method of claim 1, wherein the first metal member and second metal member are bonded together via solid phase diffusion bonding.

8. The method of manufacturing a composite metal material according to claim 1,
wherein the respective divided members of the plurality of divided members are divided along a predetermined plane so that surfaces of each divided member facing the plane are parallel.

9. The method of claim 8, wherein the first metal member and second metal member are bonded together via solid phase diffusion bonding.

10. The method of claim 1, wherein the first metal member and the second metal member are bonded to each other on a plane where the first metal member and the second metal member face each other in an opposed manner due to a second pressure generated because of the difference in linear expansion coefficients between first metal and second metal.

11. The method of claim 8, wherein the first metal member and the second metal member are bonded to each other on a plane where the first metal member and the second metal member face each other in an opposed manner due to a second pressure generated because of the difference in linear expansion coefficients between first metal and second metal.

* * * * *